US008355996B2

(12) United States Patent
Eguchi et al.

(10) Patent No.: US 8,355,996 B2
(45) Date of Patent: Jan. 15, 2013

(54) PLANT CONTROL APPARATUS THAT USES A MODEL TO SIMULATE THE PLANT AND A PATTERN BASE CONTAINING STATE INFORMATION

(75) Inventors: Toru Eguchi, Mito (JP); Takaaki Sekiai, Hitachi (JP); Akihiro Yamada, Tokai (JP); Masayuki Fukai, Hitachi (JP); Satoru Shimizu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1041 days.

(21) Appl. No.: 12/132,639

(22) Filed: Jun. 4, 2008

(65) Prior Publication Data

US 2008/0306890 A1 Dec. 11, 2008

(30) Foreign Application Priority Data

Jun. 7, 2007 (JP) ................................. 2007-151986

(51) Int. Cl.
G06F 15/18 (2006.01)
(52) U.S. Cl. ......................................................... 706/12
(58) Field of Classification Search .............. 706/45–48, 706/12; 702/1, 85, 98, 99, 104, 24; 73/1.01, 73/1.02, 1.06, 19.01, 23.2, 23.31, 23.32, 73/23.33
See application file for complete search history.

(56) References Cited

U.S. PATENT DOCUMENTS

| | | | | |
|---|---|---|---|---|
| 5,249,954 A | * | 10/1993 | Allen et al. ..................... | 431/14 |
| 6,529,887 B1 | | 3/2003 | Doya et al. | |
| 7,123,971 B2 | * | 10/2006 | Piche ............................. | 700/19 |
| 2007/0142975 A1 | * | 6/2007 | Piche ............................. | 700/286 |
| 2007/0156288 A1 | * | 7/2007 | Wroblewski et al. .......... | 700/266 |
| 2007/0203862 A1 | * | 8/2007 | Sekiai et al. .................... | 706/16 |
| 2007/0234781 A1 | | 10/2007 | Yamada et al. | |
| 2007/0250215 A1 | * | 10/2007 | Jia et al. ......................... | 700/274 |
| 2008/0104101 A1 | * | 5/2008 | Kirshenbaum et al. ........ | 707/102 |
| 2009/0240636 A1 | * | 9/2009 | Hofmann et al. ................ | 706/12 |

FOREIGN PATENT DOCUMENTS

| | | |
|---|---|---|
| JP | 07-160661 | 6/1995 |
| JP | 10-074188 | 3/1998 |
| JP | 2000-035956 | 2/2000 |
| JP | 2000-181526 | 6/2000 |
| JP | 2007-241624 | 9/2007 |
| JP | 2007-272361 | 10/2007 |
| JP | 2007-272498 | 10/2007 |
| JP | 2007-272646 | 10/2007 |

OTHER PUBLICATIONS

James, et. al., Optimization with ProcessLink at the Roanoke Valley Energy Facility, 2000, Proc. of Powergen 2000, pp. 1-13.*

* cited by examiner

*Primary Examiner* — David Vincent
(74) *Attorney, Agent, or Firm* — Antonelli, Terry, Stout & Kraus, LLP.

(57) ABSTRACT

A plant control system includes: a numerical calculation execution part which calculates the operation characteristic of the plant; a model for simulating the plant control characteristic according to information on the numerical calculation result; a learning part which learns the plant operation method by using the model; a learning information database which stores learning information data on the learning part; a pattern generation part which generates pattern data expressing a state input based on the learning information data in the learning part with a smaller input number than the model input dimension; a pattern database which stores the pattern data generated in the pattern generation part; and a learning result determination part which selects a learning result having a preferable control effect from the learning result obtained by using a plurality of patterns.

10 Claims, 19 Drawing Sheets

FIG.6

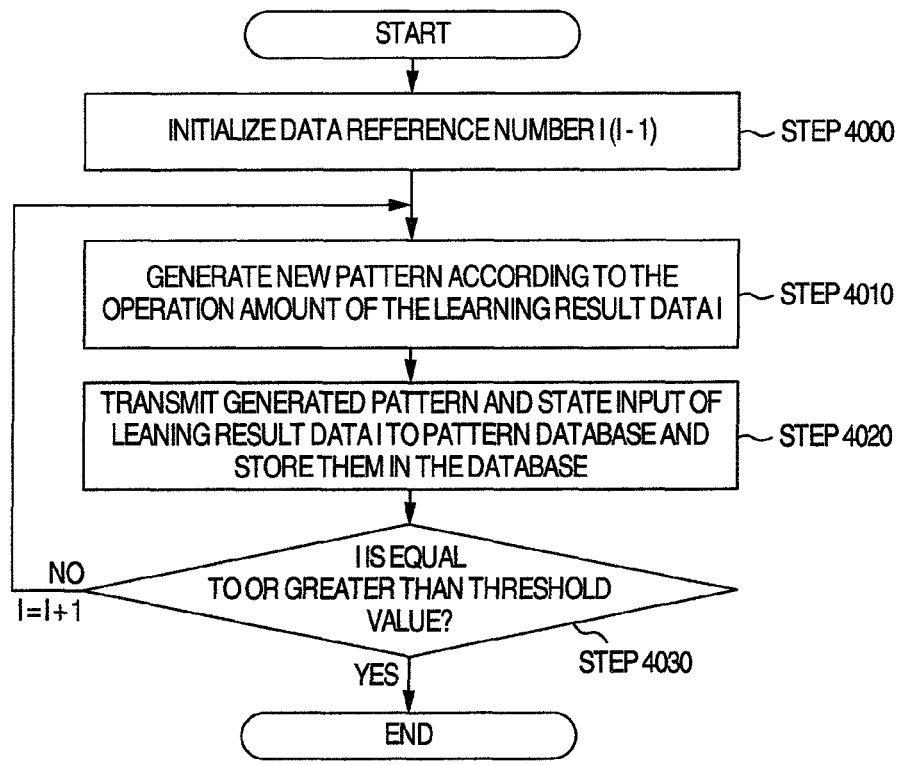

START
↓
INITIALIZE DATA REFERENCE NUMBER I (I - 1) — STEP 4000
↓
GENERATE NEW PATTERN ACCORDING TO THE OPERATION AMOUNT OF THE LEARNING RESULT DATA I — STEP 4010
↓
TRANSMIT GENERATED PATTERN AND STATE INPUT OF LEANING RESULT DATA I TO PATTERN DATABASE AND STORE THEM IN THE DATABASE — STEP 4020
↓
I IS EQUAL TO OR GREATER THAN THRESHOLD VALUE? — STEP 4030
NO → I=I+1 (loop back)
YES ↓
END

FIG.7

| | STATE INPUT VALUE | | | ... | OPERATION AMOUNT | | | ... | MODEL OUTPUT CHANGE WIDTH | | ... |
|---|---|---|---|---|---|---|---|---|---|---|---|
| | A | B | C | ... | A | B | C | ... | i | ii | ... |
| S_0001 | | | | ... | | | | ... | | | ... |
| S_0002 | | | | ... | | | | ... | | | ... |
| S_0003 | | | | ... | | | | ... | | | ... |
| S_0004 | | | | ... | | | | ... | | | ... |
| S_0005 | | | | ... | | | | ... | | | ... |

FIG.8

| | STATE INPUT PATTERN | | | | STATE INPUT VALUE | | | |
|---|---|---|---|---|---|---|---|---|
| | A | B | C | ... | A | B | C | ... |
| P_0001 | | | | ... | | | | ... |
| | | | | | | | | ... |
| | | | | | ⋮ | ⋮ | ⋮ | ⋮ |
| P_0002 | | | | ... | | | | ... |
| | | | | | | | | ... |
| | | | | | ⋮ | ⋮ | ⋮ | ⋮ |
| P_0003 | | | | ... | | | | ... |
| | | | | | | | | ... |
| | | | | | ⋮ | ⋮ | ⋮ | ⋮ |
| ⋮ | ⋮ | ⋮ | ⋮ | ⋮ | ⋮ | ⋮ | ⋮ | ⋮ |

PLANT CONTROL APPARATUS THAT USES A MODEL TO SIMULATE THE PLANT AND A PATTERN BASE CONTAINING STATE INFORMATION

BACKGROUND OF THE INVENTION

The present invention relates to a plant control system and in particular or system, to a thermal power plant.

The plant control system processes a measurement signal of an operation state amount obtained from a plant to be controlled, calculates an operation signal to be supplied to the plant to be controlled, and transmits it as a control instruction to the control system.

The plant control system uses an algorithm for calculating the operation signal so that the measurement signal of the plant operation state amount satisfies its target value.

It is possible to use the PI (proportion/integration) control algorithm for controlling the plant. In the PI control, the deviation of the plant measurement signal from its target value is multiplied by the proportion gain. The obtained value is added by the value obtained by time-integrating the deviation so as to obtain the operation signal to be supplied to the object to be controlled.

On the other hand, in order to automatically correct the control algorithm in accordance with a change of the plant operation state and the environment, the plant may be controlled by using the adaptive control and the learning algorithm.

JP-A-2000-35956 discloses a control apparatus using a reinforced learning method using a model as a method for obtaining the operation signal of the control apparatus for controlling the plant by using the learning algorithm.

In the method using the technique of the reinforced learning method, the control apparatus includes a model for predicting the characteristic of the object to be controlled and a learning part for learning the method for generating such a model input that a model output can achieve the target value.

By inputting the model input learned by the learning part to the model, it is possible to obtain the effect that the model output approaches the target value.

The learning type adaptive control corrects the model by using the measurement signal which has measured the plant operation state and performs re-learning by using the corrected model so as to perform online correction/modification of the control algorithm for accurately controlling the plant.

Accordingly, it is necessary to correct the model within a cycle (control cycle) during which the operation signal outputted from the control apparatus is modified for the plant and use the corrected model for the re-learning so as to complete the learning and correct/modify the control algorithm.

The control cycle can be considered as a time from the plant operation completion to the moment when the plant enters a static state, which is normally several minutes or several tens of minutes.

For example, when controlling a complicated plant such as a thermal power plant, the model input dimension is several tens or several hundreds and the number of combinations of the learning model inputs (search space) increases, which in turn requires a long learning time. As a result, it becomes difficult to online-correct/modify the control algorithm required for accurately controlling the plant.

Consequently, in order to complete the learning within the control cycle, it is necessary to correct the model in accordance with increase of the model input dimension and increase the learning speed of re-learning by using the corrected model.

JP-A-7-160661 discloses a technique for increasing the learning speed in a neural network learning by classifying teacher data into a plurality of patterns according to the combinations of the plant measurement information and extracting a learning pattern according to the control result so as to learn only the teacher data on the extracted pattern.

SUMMARY OF THE INVENTION

By using the technique of the reinforced learning method using the model disclosed in JP-A-2000-35956, it is possible to automatically learn the method for generating an operation signal which can achieve the control target.

However, when a model is corrected according to the measurement signal which has measured the plant operation state and the corrected model is used for re-learning so as to correct the control algorithm, the model input dimension increases in a complicated plant, which makes it difficult to perform the learning within the control cycle for controlling the plant.

Moreover, when the technique disclosed in JP-A-7-160661 is used, it is possible to divide the teacher data by patterning so as to reduce the search space and increase the learning speed. That is, even if the model input dimension increases and the search space (number of teacher data) increases, it is possible to perform learning within the control cycle by executing the appropriate patterning.

However, when the teacher data to be classified is biased, the number of teacher data may be too small depending on the learning pattern and it may not be possible to acquire a desired learning result.

Moreover, since the type of patterns to be classified is decided according to the knowledge of a designer of the control apparatus, there is a problem that the pattern generation requires a large load on the operator.

It is therefore an object of the present invention to provide a plant control system which corrects a model in accordance with a measurement signal which has measured a plant operation state and uses the corrected model for re-learning, which enables execution of the high-speed learning for correcting the plant control algorithm and accurately controlling the plant.

A plant control system for controlling a plant including an operation signal generation part which calculates an control instruction operation signal for a plant to be controlled by using a measurement signal which has measured an operation state of the plant, apparatus comprising: an operation signal database which stores the measurement signal of the measured plant; an operation signal database which stores an operation signal for the plant; a numerical calculation execution part which calculates the operation characteristic of the plant; a numerical calculation database which stores the numerical calculation result from the numerical calculation execution part; a simulation model which simulates control characteristic of a plant when the operation signal is supplied to the plant according to information on the numerical calculation result from the numerical calculation database; a learning part which learns the plant operation method by using the model; a learning information database which stores learning information data on the learning part; a control logic database which contains information used for the operation signal outputted from the operation signal generation part; a pattern generation part which generates pattern data expressing a state input based on the learning information data in the learning part with a smaller input number than the model input dimension; a pattern database which stores the pattern data generated in the pattern generation part; and a learning result determination part which selects a learning result having a preferable control effect from the learning result obtained by using a plurality of patterns; wherein the operation signal is calculated from the operation signal generation part according to the learning result selected by the learning result determination part.

According to the present invention, it is possible to provide a plant control system which corrects a model according to a measurement signal which has measured the plant operation state and performs re-learning at a high speed by using the corrected model, thereby correcting the plant control algorithm so as to accurately control the plant.

Other objects, features and advantages of the invention will become apparent from the following description of the embodiments of the invention taken in conjunction with the accompanying drawings.

BRIEF DESCRIPTION OF DRAWINGS

FIG. 6 is a flowchart showing the pattern generation operation in the flowchart showing the operation of the plant control system according to the embodiment of the present invention shown in FIG. 4.

FIG. 7 explains an example of the information stored in a learning information database in the plant control system according to the embodiment of the present invention shown in FIG. 1.

FIG. 8 explains an example of the information stored in a pattern database in the plant control system according to the embodiment of the present invention shown in FIG. 1.

DETAILED DESCRIPTION OF THE EMBODIMENTS

Description will now be directed to a plant control system according to an embodiment of the present invention with reference to the attached drawings.

Embodiment 1

Figure 1:
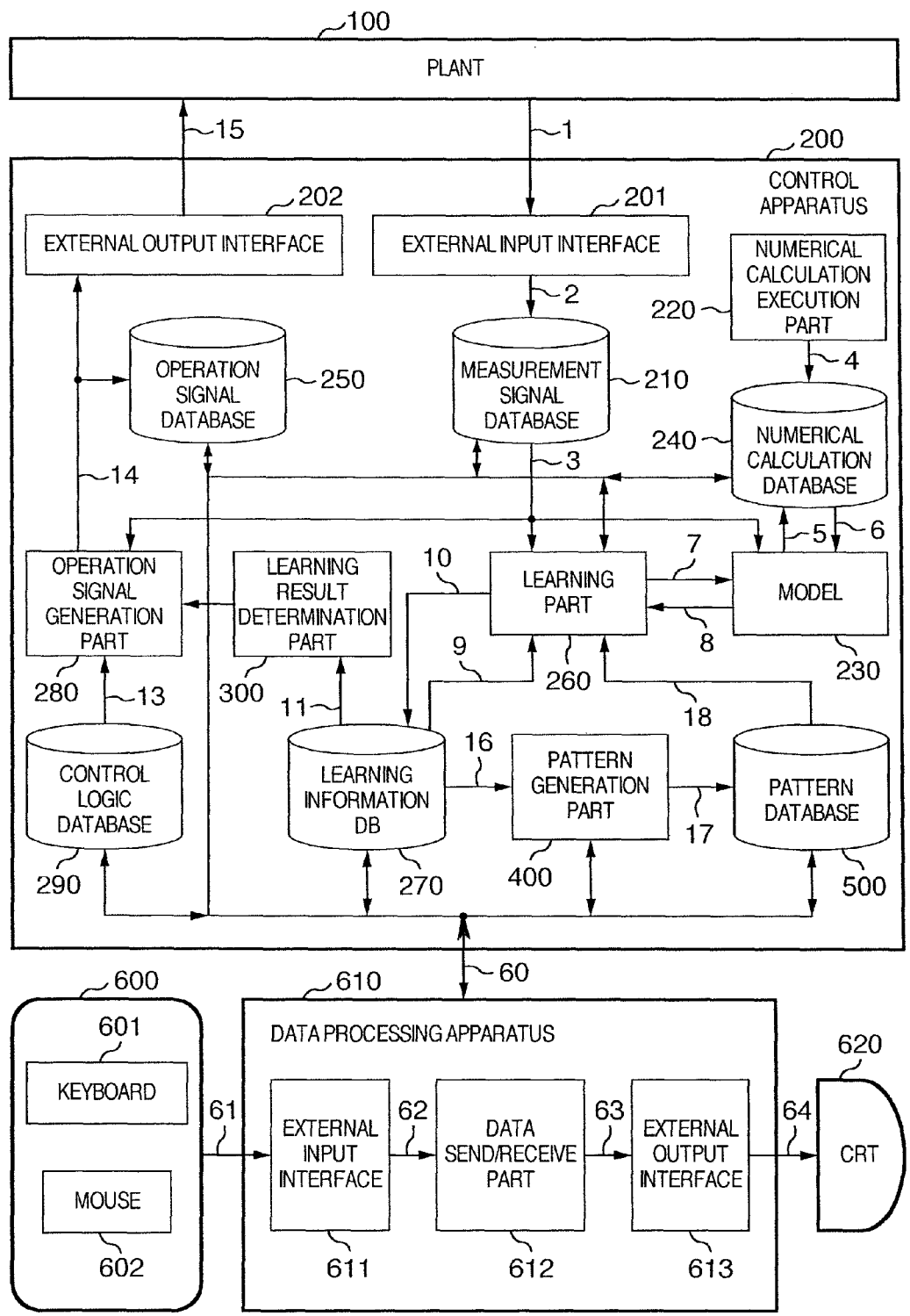
FIG. 1 is a control block diagram showing an entire configuration of a plant control system according to an embodiment of the present invention.

FIG. 1 is a block diagram showing the entire configuration of the plant control system according to an embodiment of the present invention.

In FIG. 1, the plant of the present embodiment is a plant 100 constituting a thermal power plant including a boiler using coal as fuel. The thermal power plant 100 including the boiler is configured so as to be controlled by a control apparatus 200.

The control apparatus 200 for controlling the plant 100 as a control object includes, as calculation apparatuses, a numerical calculation part 220, a model 230, a learning part 260, an operation signal generation part 280, a learning result judging part 300, and a pattern generation part 400.

The control apparatus 200 includes as databases, a measurement signal database 210, a numerical calculation database 240, an operation signal database 250, a learning information database, a control logic database 290, and a pattern database 500.

Furthermore, the control apparatus 200 includes, as an external interface, an external input interface 201 and an external output interface 202.

The control apparatus 200 acquires the measurement signal 1 which has measured various state amounts of a thermal power plant from the thermal power plant 100 via the external input interface 291.

Moreover, the control apparatus 200 sends an operation signal 15 for controlling, for example, a burner of the boiler and an air flow rate of an air port via the external output interface 202 to the plant 100 as the thermal power plant of the control object.

In the control apparatus 200, the measurement signal 1 which has measured various state amounts of the plant 100 is sent to the external input interface 201 and stored as the measurement signal 2 in the measurement signal database 210 as a database of the control apparatus 200.

An operation signal 14 generated by an operation signal generation part 280 as a calculation apparatus provided in the control apparatus 200 is sent to the external output interface 202 and stored in the operation signal database 250 as a database provided in the control apparatus 200.

The operation signal generation part 280 uses control logic data 13 stored in the control logic database 290 and learning data 12 outputted from the learning result determination part 300 as a calculation apparatus provided in the control apparatus 200 so as to generate the operation signal 14 functioning as the operation signal 15 for the plant 100, so that the measurement signal 1 of the plant 100 achieves an operation target value and outputs the signal to the external interface 202.

The control logic database 290 contains a control circuit and a control parameter used for calculating the control logic data 13 so as to output the control logic data.

The known PI control can be used in the control circuit for calculating the control logic data 13.

The learning data stored in the learning information database 270 as a database provided in the control apparatus 200 is generated by a learning part 260 provided in the control apparatus 200.

The learning part 260 is connected to the model 230 as a calculation apparatus provided in the control apparatus 200.

The model 230 has a function for simulating the control characteristic of the plant 100 as the thermal power plant. That is, the model 230 performs a calculation for simulation of the following: the operation signal 15 serving as a control instruction is supplied to the plant 100 so as to obtain the measurement signal 1 as the control result.

For this simulation calculation, a model input 7 for operating the model 230 is received from the learning part 260 and the model 230 performs simulation calculation of the characteristic change by control of the plan so as to obtain a model output 8 as the result of the simulation calculation.

Here, the model output 8 is a predicted value of the measurement signal 1 of the plant 100.

The model 230 is configured according to the numerical calculation result 6 stored in the numerical calculation database 240 as a database provided in the control apparatus 200.

The numerical calculation part 220 as a calculation apparatus provided in the control apparatus 200 analyzes the operation characteristic of the plant 100 by using a physical model simulating the plant 100.

The calculation result 4 obtained by analyzing the characteristic of the plant 100 by using the physical model in the numerical calculation part 220 is stored in the numerical calculation database 240.

The model 230 calculates a model output 8 corresponding to the model input 7 by using information stored in the numerical calculation database 240 and the measurement signal database 210 and employing the statistical method such as the neural network.

The model 230 extracts the numerical calculation result 6 required for calculating the model output 8 corresponding to the model input 7 from the numerical calculation database 240 by using the model information data 5 and interpolates the result.

Moreover, the model 230 can be corrected by using the measurement signal 3 stored in the measurement database 210 so that the control characteristics of the model 230 and the plant 100 coincide with each other when the characteristic of the physical model of the numerical calculation part 220 is different from the characteristic of the plant 100.

The learning part 260 learns a method for generating the model input 7 so that the model output 8 which is simulation-calculated by the model 230 achieves the model output target value set in advance by an operation staff.

Here, the current model input is inputted to the learning part 260 so as to output its model input change width. Here, the input to the learning part 260 will be called a state input and the output will be called an operation amount.

The constriction condition used for learning and the learning information data 9 containing the model output target value are stored in the learning information database 270.

The learning part 260 directly learns the state input before start of the plant operation and, after the start of the plant operation, performs learning by patterning the state input by using the pattern data stored in a pattern database 500 which will be detailed later.

Moreover, the learning data 10 obtained as a result of the learning in the learning part 260 is stored in the learning information database 270 provided in the control apparatus 200.

The learning data 10 includes the state input before the model input modification, the operation amount at the state input, and information on the model output change width obtained as a result of the operation. It should be noted that the functions of the learning part 260 will be detailed later.

The pattern generation part 400 as a calculation apparatus provided in the control apparatus 200 generates pattern data 17 by using the learning data 16 learned before the start of the plant operation in the learning part 260 and stores the pattern data 17 in the pattern database 500.

After operation of the plant 100 is started, optimal pattern data 18 similar to the measurement signal 3 is selected from the pattern data stored in the pattern database 500 and the learning part 260 patterns the state input contained in the measurement signal 3.

The learning data 11 obtained by the learning in the learning part 260 and stored in the learning information database 270 is inputted to a learning result determination part 300 as a calculation apparatus provided in the control apparatus 200.

When a plurality of pattern data 18 are used for the learning, the learning result determination part 300 selects the learning data which makes the control effect to be maximum from the respective pattern learning data 11. When only one pattern is used, the learning data on the pattern is selected.

The learning data 12 selected by the learning result determination part 300 is inputted the operation signal generation part 280.

The operation staff of the plant 100 can access information stored in various databases provided in the control apparatus 200 by using an external input device 600 formed by a keyboard 601 and a mouse 602, a data processing apparatus 610 having a data send/receive part 612 which can send and receive data to/from the control apparatus 200, and a display 620.

Moreover, the operation staff of the plant 100 can use the aforementioned apparatuses to input setting parameters used in the numerical calculation part 200, the learning part 260, and the pattern generation part 400 which are provided in the control apparatus 200.

The data processing apparatus 610 is formed by an external input interface 611, a data send/receive part 612, and an external output interface 613.

The input signal 61 of the data processing apparatus generated in the external input apparatus 600 is inputted to the data processing apparatus 610 via the external input interface 611. The data send/receive part 612 of the data processing apparatus 610 acquires the I/O data information 60 provided in the control apparatus 200 according to the information in the data processing apparatus input signal 62.

Moreover, according to the information in the data processing apparatus input signal 62, the data send/receive part 612 outputs the I/O data information 60 containing the parameter setting value used in the numerical calculation part 220, the learning part 260, and the pattern generation part 400 provided in the control apparatus 200.

The data send/receive part 610 transmits data processing apparatus output signal 63 obtained by processing the I/O data information 60, to the external output interface 613. A data processing apparatus output signal 64 is sent from the external output interface 613 to the display 620 and displayed. Accordingly, information stored in the respective databases provided in the control apparatus 200 can be displayed on the display 620.

It should be noted that the plant control system 200 according to the embodiment of the present invention includes the measurement signal database 210, the numerical calculation database 240, the operation signal database 250, the learning information database 270, the control logic database 290, and the pattern database 500 which are arranged so as to constitute the calculation apparatus of the control apparatus 200. However, it is also possible to arrange all or some of them outside the control apparatus 200.

Moreover, in the aforementioned example, the numerical calculation part 220 is built in the control apparatus 200. However, it is also possible to arrange it outside the control apparatus 200.

For example, it is also possible to arrange the numerical calculation part 220 and the numerical calculation database 240 outside the control apparatus 200 and the numerical calculation result 6 is sent to the control apparatus 200 via the Internet.

Next, the learning part 260 provided in the control apparatus 200 will be detailed with reference to FIG. 2.

Figure 2:
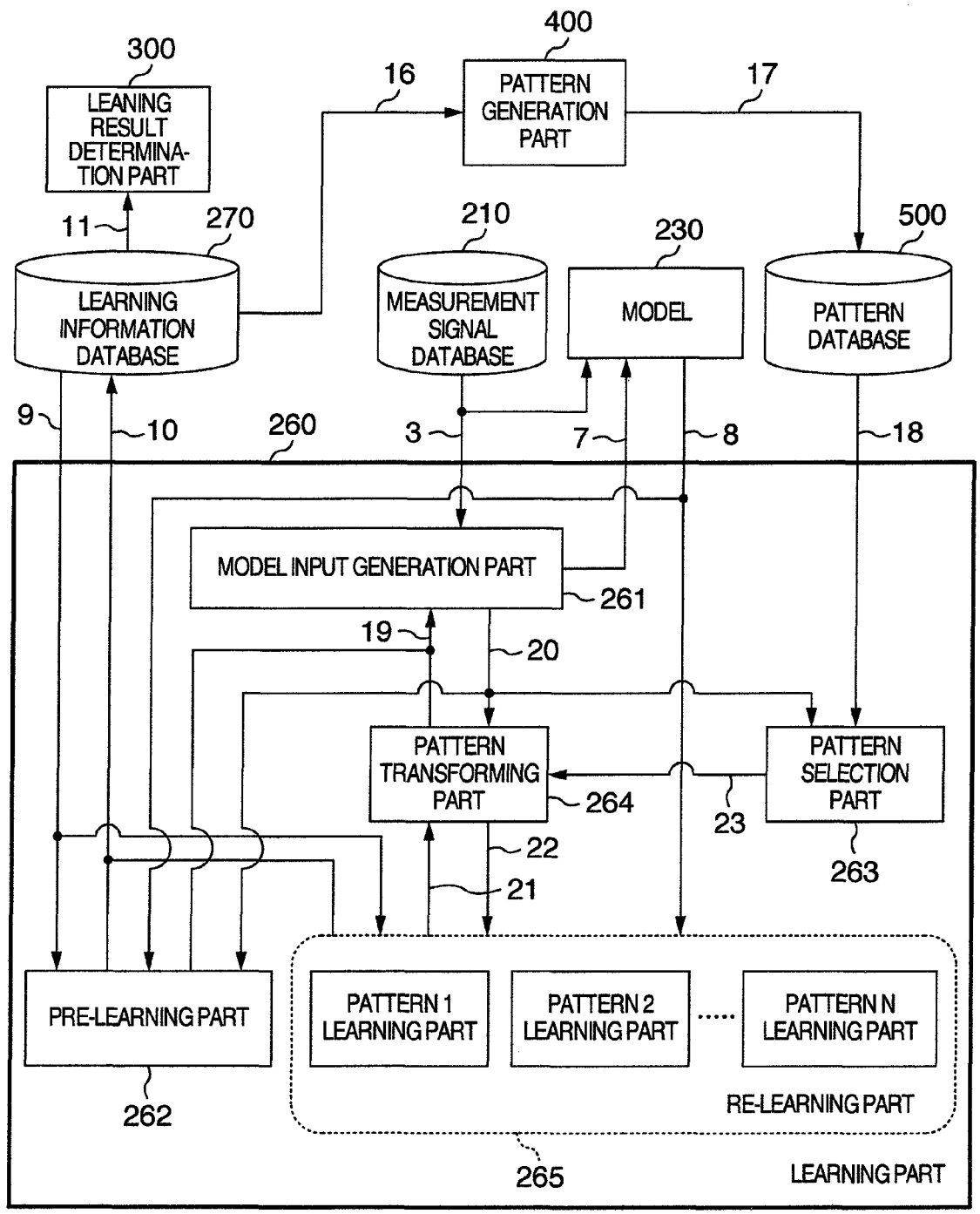
FIG. 2 is control block diagram indicating a learning part of a plant control system according to the embodiment of the present invention shown in FIG. 1.

As shown in FIG. 2, the learning part 260 includes a model input generation part 261, a pre-learning part 262, a pattern selection part 263, a pattern transforming part 264, and a re-learning part 265.

The model input generation part 261 constituting the learning part 260 applies an operation amount 19 to the current model input condition of the model 230 so as to generate the model input 7 and the state input 20 after the operation, by the model input generation part.

Moreover, the state input 20 is extracted by using the model input generation part 261 from the measurement signal 3 of the plant 100 stored in the measurement signal database 210.

The pre-learning part 262 constituting the learning part 260 uses the learning information data 9 stored in the learning information database 270 before start of the operation of the plant 100, so as to learn the method for generating the model input 7 so that the model output 8 simulated/calculated by the model 230 can achieve the model output target value.

Here, the state input 20 is used as it is. The model input 7 is generated by applying the operation amount 19 learned by the pre-learning part 262, to the current model input condition, inputs it to the model 230, and inputs it as the state input 20 after the operation to the pre-learning part 262.

The learning data 10 obtained as a result of the learning in the pre-learning part 262 is stored in the learning information database 270.

According to the learning information 16 stored in the learning information database 270, the pattern generation part 400 generates pattern data and stores the pattern data 17 generated by the pattern generation part 400, in the pattern database 500.

The pattern selection part 263 constituting the learning part 260 selects the pattern data 23 from the pattern data 18 stored in the pattern database 500 according to the state input 20 and supplies it to the pattern transforming part 264.

The pattern transforming part 264 constituting the learning part 250 patterns the pattern data 23 selected by the pattern selection part 263 and reduces the input dimension.

Moreover, the pattern transforming part 264 executes inverse operation on the operation amount 21 learned by the patterning so as to increase the input dimension.

Figure 3:
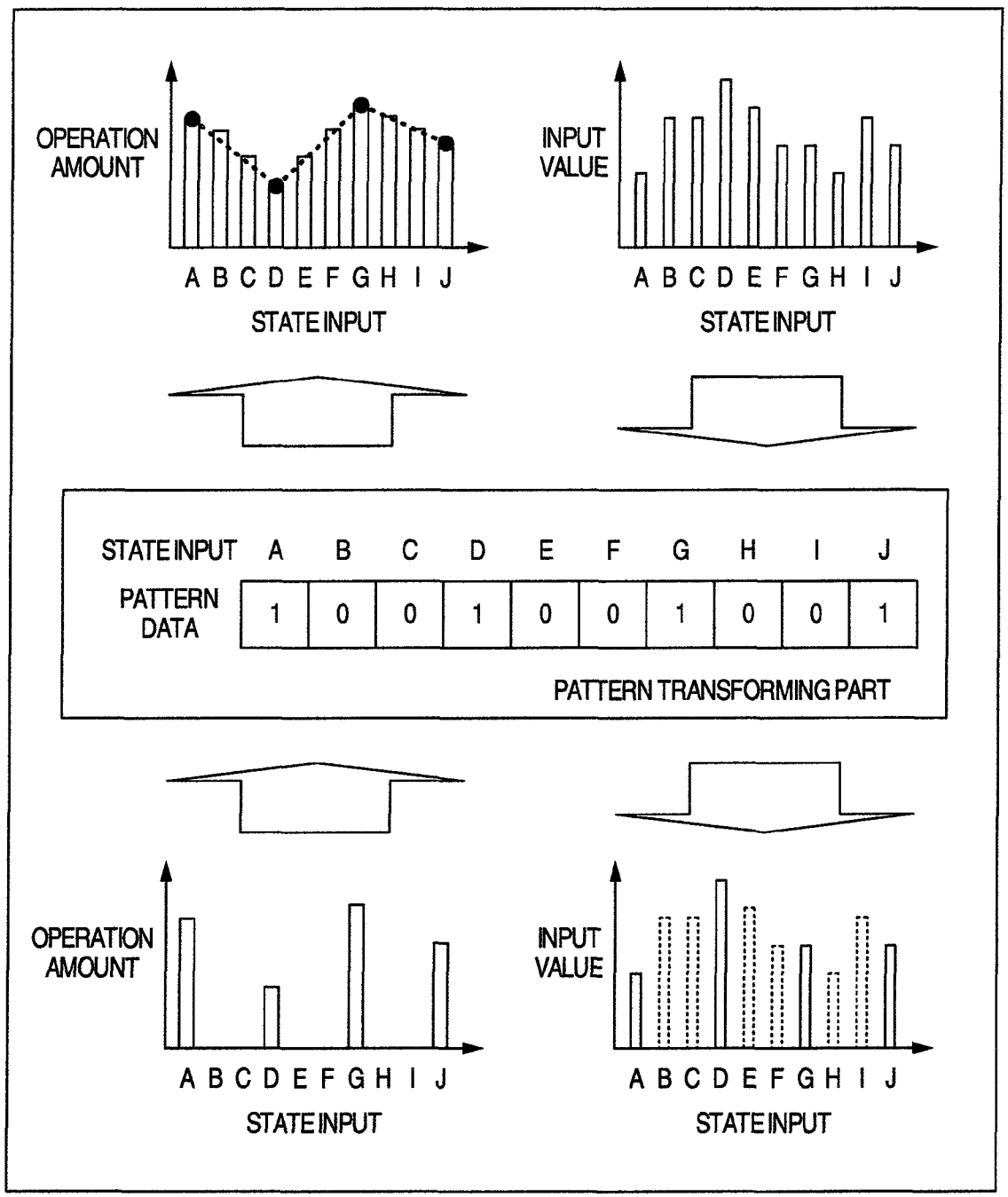
FIG. 3 explains the patterning operation in the plant control system according to the embodiment of the present invention shown in FIG. 1.

Referring to FIG. 3, explanation will be given on the patterning. As shown in FIG. 3, the pattern transforming part 264 processes the pattern data as follows: the input information value to be used in the patterning is set to 1 and the input information value not to be used is set to 0.

Accordingly, when patterning the state input 20, only the input having the pattern data information value 1 for the state input 20 is selected.

Moreover, in the inverse operation, linear interpolation is performed between the inputs used in the patterning for the operation amount 21 patterned after the learning so as to obtain an operation amount of other inputs.

In FIG. 2, the re-learning part 265 constituting the learning part 260 learns the generation method of the model input 7 after the operation of the plant is started, by using the learning information data 9 stored in the learning information database 270, so that the model output 8 to be simulated/calculated by the model 230 corrected by the measurement signal 3 can achieve the model output target value.

Here, the pattern transforming part 264 patterns the state input 20. The patterned state input 22 is supplied to the re-learning part 265 corresponding to the pattern. As a result of learning in the re-learning part, a patterned operation amount 21 is outputted from the re-learning part 265.

The patterned operation amount is transformed again into the operation amount 19 by the pattern transforming part 264 and inputted to the model input generation part 261 so as to generate the model input 7 and the state input 20 after the operation.

With the configuration thus far explained, the learning part 260 realizes the pre-learning for the pattern generation before starting the operation of the plant and the re-learning by the patterning of the state input after the operation start of the plant 100.

Figure 4:
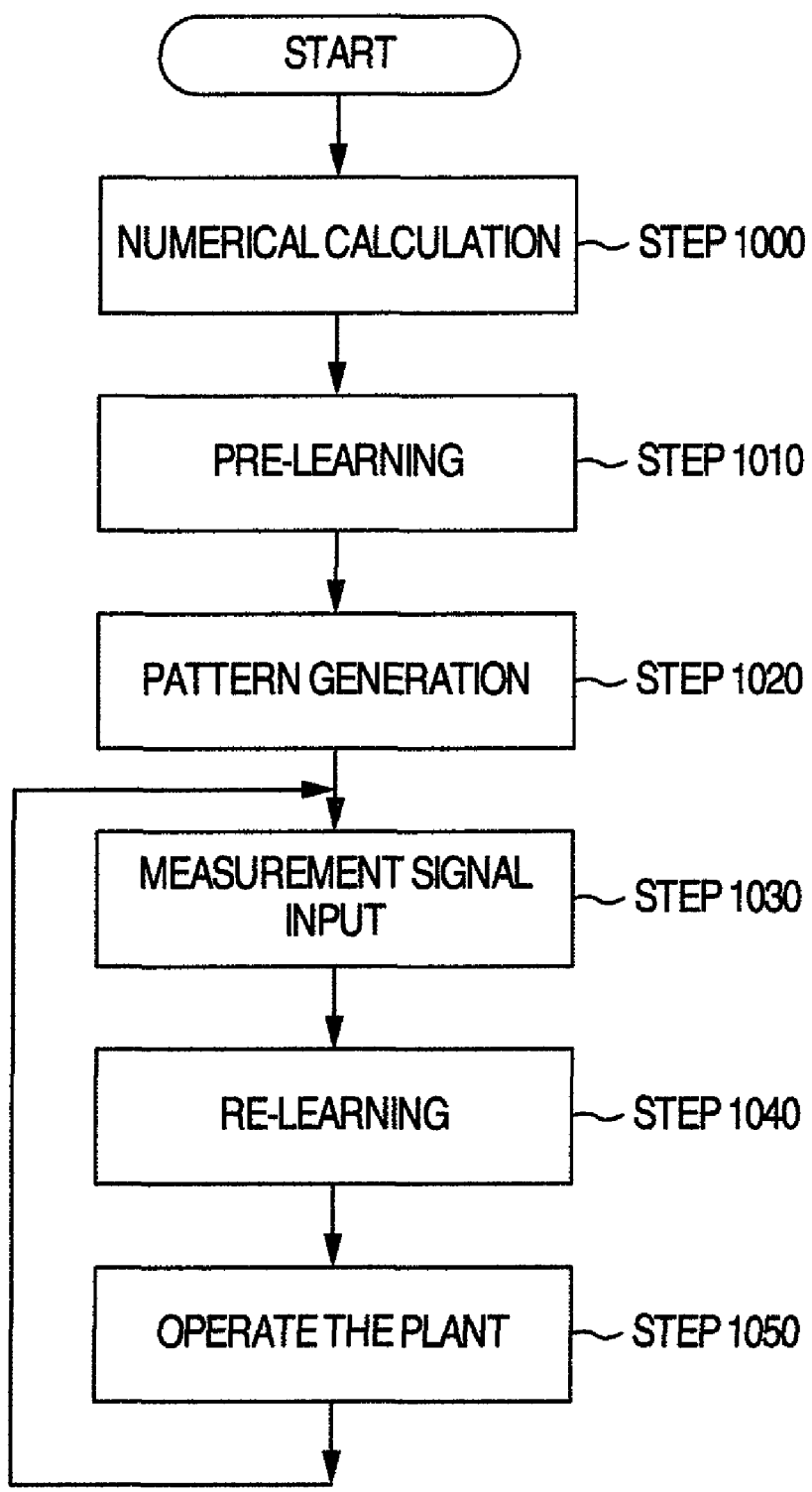
FIG. 4 is a flowchart showing the operation of the plant control system according to the embodiment of the present invention shown in FIG. 1.

FIG. 4 is a flowchart showing the operation of the control apparatus 200 for controlling a plant as the embodiment of the present invention explained with reference to FIG. 1 to FIG. 3.

In the flowchart of FIG. 4, a combination of steps 1000, 1010, 1020, 1030, 1040, and 1050 is executed. Hereinafter, explanation will be given on each of the steps.

After start of the operation of the control apparatus 200 for controlling the plant 100, firstly, in step 1000, numerical calculation is executed by the numerical calculation part 220 of the control apparatus 200 and the numerical calculation data 4 is sent to the numerical calculation database 240 so as to be stored in it.

Next, in step 1010, the learning part 260 and the model 230 of the control apparatus 200 are used to execute pre-learning of the plant operation method and transmit the learning data 10 to the learning information database 270 so as to be stored in it.

Next, in step 1020, the pattern generation part 400 of the control apparatus generates pattern data 17 by using the learning data 16 obtained by pre-learning stored in the learning information database 270 and transmits the pattern data 17 to the pattern database 500 so as to be stored in it. The aforementioned operation is executed before starting the operation of the plant 100.

After the operation of the plant 100 is started, step 1030 inputs the measurement signal 1 of the plant 100 to the control apparatus 200 by using the external input interface 201 and transmits it to the measurement signal database 210 so as to be stored in it.

Step 1040 patterns the state input extracted by the acquired measurement signal 3 by using the pattern database stored in the pattern database 500 and executes re-learning in the learning part 260.

After the learning in the learning part 260, by using the learning result determination part 300 of the control apparatus 200, appropriate learning data 12 is selected from the learning data 11 obtained by the used pattern is selected and outputted from the learning result determination part 300 to the operation signal generation part 280.

In the subsequent step 1050, the operation signal generation part 280 generates an operation signal 14 by using the learning data 12 and the control logic data 13 and outputs it as the operation signal 15 from the operation signal generation part 280 via the external input interface 202 to the plant 100.

The aforementioned steps 1030 to 1050 are repeatedly executed each time a measurement signal is inputted, thereby controlling the plant 100.

Next, the operations of the steps 1010, 1020, and 1040 in FIG. 4 will be detailed with reference to a flowchart.

Figure 5:
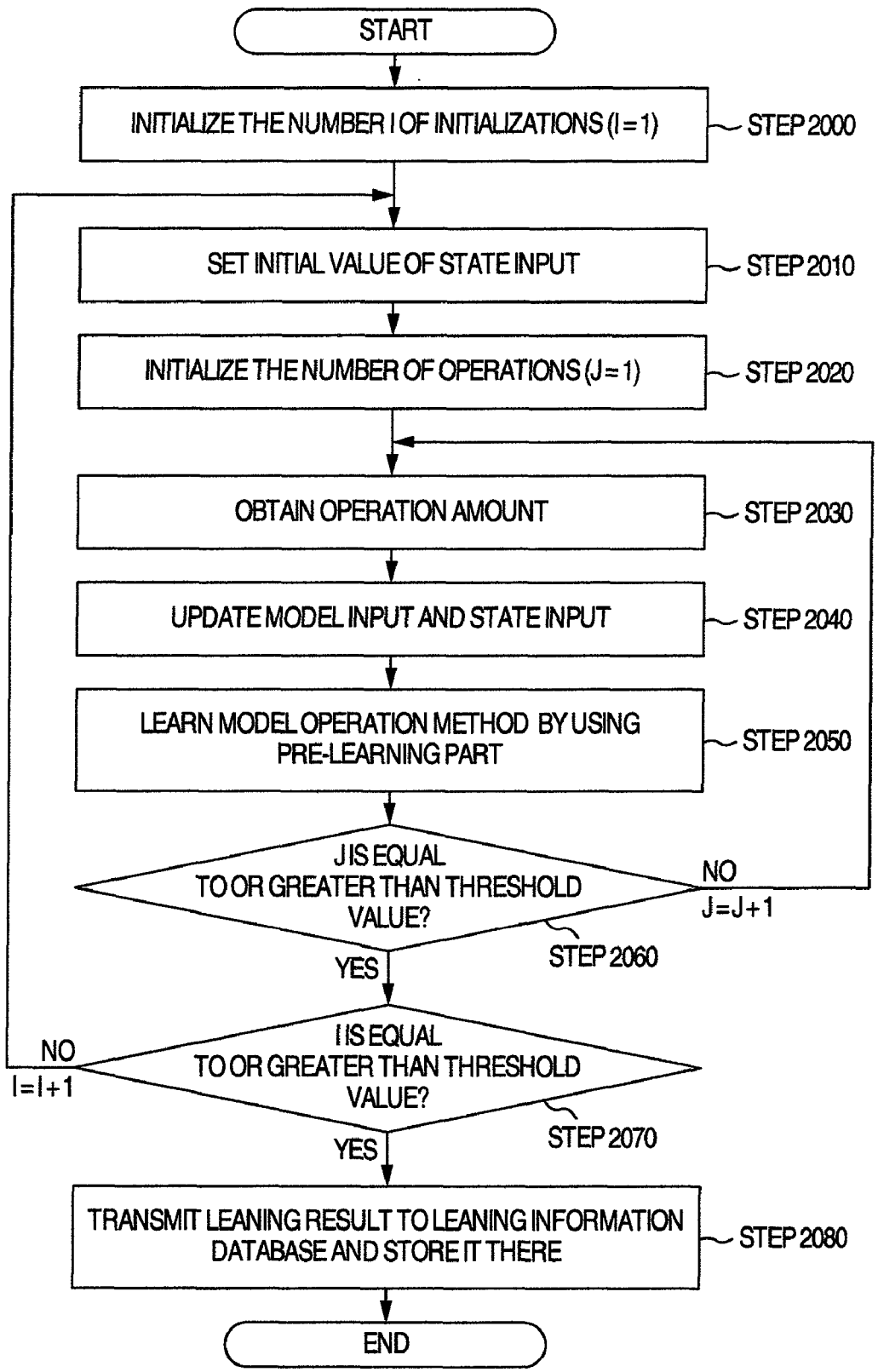
FIG. 5 is a flowchart showing the pre-learning operation in the flowchart showing the operation of the plant control system according to the embodiment of the present invention shown in FIG. 4.

FIG. 5 is a flowchart showing the operation of the pre-learning of step 1010.

As shown in FIG. 5, the flowchart of the pre-learning operation is executed by a combination of steps 2000, 2010, 2020, 2030, 2040, 2050, 2060, 2070, and 2080.

Hereinafter, a detailed explanation will be given on each of the steps.

Step 2000 initializes (sets I=1) the number of initialization times I which indicates the number of repetitions of the steps 2010 to 2060.

Next, step 2010 sets an initial value of the state input. An arbitrary model input value can be selected as the initial value of the state input.

Step 2020 initializes (sets J=1) the number of operation times J indicating the number of operation times J indicating the number of repetitions of steps 2030 to 2050.

Next, step 2030 obtains an operation amount of the model input by using the pre-learning part 262 of the learning part 260 constituting the control apparatus 200.

Step 2040 adds the operation amount to the state input by using the model input generation part of the learning part 260 to operate the model 230 and update the state input.

Step 2050 learns the operation method of the model 230 by using the neural network and various learning algorithms such as the reinforced learning according to the model output obtained as a result of the operation of the model 2230.

Step 2060 is a branching section where the number of operation times J is compared to a predetermined threshold value. If J is smaller than the threshold value, J is incremented by 1 and control is returned to step 2030. If J is greater than the threshold value, control is passed to step 2070 which is a branching section.

Step 2070 compares the number of initialization times I to the predetermined threshold value. If I is smaller than the threshold value, I is incremented by 1 and control is returned to step 2010. If I is greater than the threshold value, control is passed to step 2080.

Step 2080 transmits the learning result obtained by the learning part 260 to the learning information database 270 so as to be stored in it. Then, control is passed to step to terminate the pre-learning operation.

By the aforementioned operation, the pre-learning starts learning by using an arbitrary model input as the initial value of the state input in step 2010. Accordingly, it is possible to acquire an operation method to reach the model output target value from an arbitrary model input condition.

FIG. 6 is a flowchart showing the pattern generation of step 1020.

As shown in FIG. 6, the flowchart of the pattern generation operation executes a combination of steps 4000, 4010, 4020, and 4030.

Hereinafter, each of the steps will be detailed with reference to FIG. 7 and FIG. 8, Step 4000 initializes (sets I=1) the data reference number I as the value indicating the number of repetitions of the steps 4010 to 4020.

Next, step 4010 references the learning data obtained by pre-learning stored in the learning information database 270 according to I so as to generate a pattern. It should be noted that a detailed explanation will be given later on the pattern generation algorithm.

FIG. 7 shows the learning data stored in the learning information database 270 of the control apparatus 200.

As shown in FIG. 7, the learning information database 270 contains the state input value, the operation amount value in its state input, and the model output amount obtained as the result of the operation.

A pattern is generated according to the operation amount in the learning data. It should be noted that in FIG. 7, S_0001 is a number assigned for distinguishing the state input.

Step 4020 in FIG. 6 transmits the generated pattern and the state input value of the referenced learning data to the pattern database 500 so as to be stored in it.

FIG. 8 shows the learning data stored in the pattern database 500 of the control apparatus 200.

As shown in FIG. 8, the pattern database 500 contains the pattern data and the state input value referenced upon generation of the pattern.

When storing the generated pattern, if the generated pattern coincides with the pattern data already stored, it is stored as the state input corresponding to the pattern data.

Accordingly, there is a case that one pattern data is correlated to a plurality of state inputs. It should be noted that in FIG. 8, P_0001 is a number assigned to distinguish pattern data.

Step 4030 in FIG. 6 is a branching section where the data reference number I is compared to the predetermined threshold value. If J is smaller than the threshold value, J is incremented by 1 and control is returned to step 4010. On the contrary, if J is equal to or greater than the threshold value, control is passed to the step to terminate the operation of the pattern generation.

Next, a detailed explanation will be given on the pattern generation algorithm of step 4010 with reference to the flowchart of FIG. 9 and FIG. 10.

Figure 10:
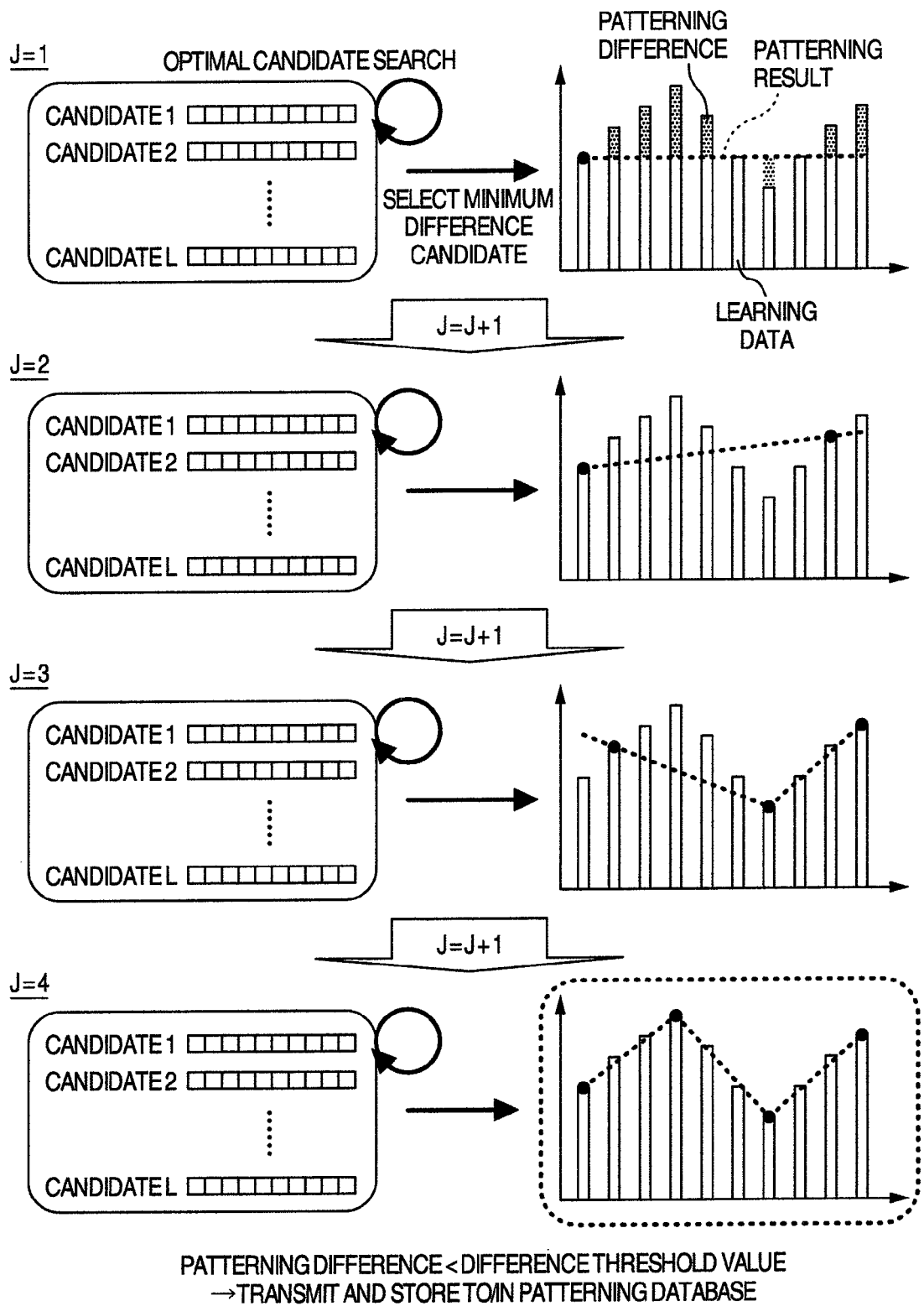
FIG. 10 explains the pattern search algorithm for calculating a patterning error in the flowchart showing the operation of the plant control system according to the embodiment of the present invention shown in FIG. 9.

As shown in FIG. 10, the pattern generation algorithm starts search from the pattern input dimension 1 in order to suppress the input dimension to be patterned to a minimum value and repeats the search to generate a pattern while increasing the input dimension until the end condition is satisfied.

Moreover, in order to effectively perform the pattern search, the evolution search algorithm is used for the search. That is, the pattern database expression is made to be a gene (solution candidate) and the generated solution candidates are subjected to genetic operations such as mixing and mutation so as to search for an optimal pattern.

Figure 9:
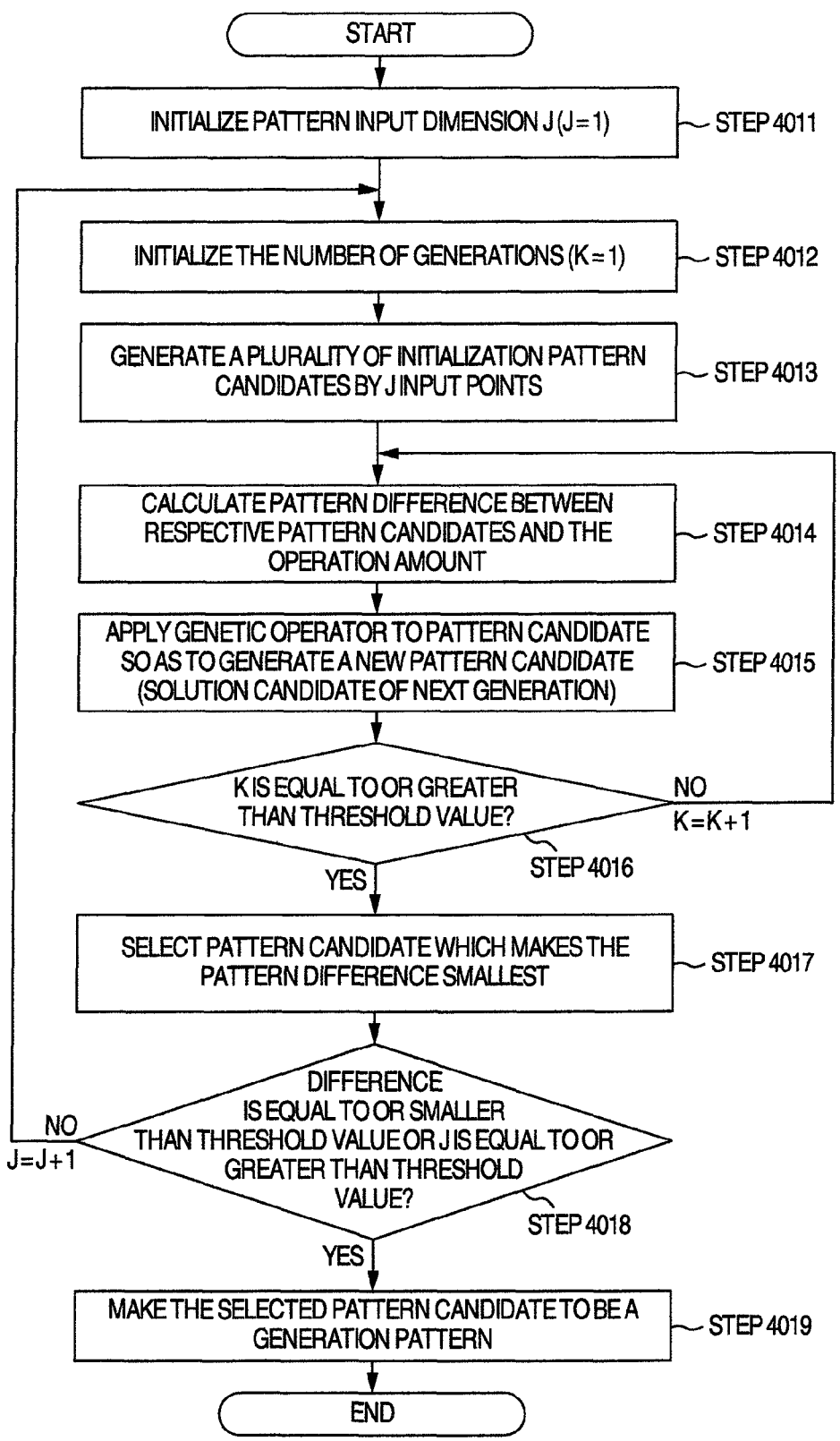
FIG. 9 is a flowchart for detailed explanation of the pattern search algorithm as a part of the pattern generation operation in the flowchart showing the operation of the plant control system according to the embodiment of the present invention shown in FIG. 4.

As shown in FIG. 9, the flowchart of step 4010 is formed by a combination of steps 4011, 4012, 4013, 4014, 4015, 4016, 4017, 4018, and 4019.

Hereinafter, each of the steps will be detailed.

Step 4011 initializes J (J=1) as a value indicating the input dimension used for patterning.

Step 4012 initializes the number of generations K (set K=1) as a value indicating the number of repetitions of steps 4010 to 4015.

Next, step 4013 generates L solution candidates under the constriction condition that J is the input dimension which makes the pattern data information value.

Step 4014 calculates a patterning error for each of the solution candidates.

As shown in FIG. 10, the patterning error is calculated as an operation amount obtained by linearly interpolating the operation amount of the learning data to be referenced and the input used in patterning.

Step 4015 performs genetic operations such as crossover and mutation on the solution candidates under the constriction condition according to the calculated patterning error so as to generate a new solution candidate.

Step 4016 is a branching section. If the number of generations K is equal to or smaller than a predetermined threshold value, K is incremented by 1 and control is returned to step 4010. Otherwise, control is passed to step 4017.

Step 4017 selects a solution candidate which makes the patterning error to be minimum for the solution candidate group which has passed through the predetermined number of generations and control is passed to step 4018.

Step 4018 is a branching section. If the patterning error of the solution candidate selected in step 4017 is equal to or greater than a predetermined threshold value, or the input dimension J is equal to or smaller than a predetermined threshold value, J is incremented by 1 and control is returned to step 4012. Otherwise, control is passed to step 4019.

Step 4019 uses the selected solution candidate as a generation pattern and transmits it to the pattern database 500 so as to be stored in it. Control is passed to the step to terminate the operation of the pattern generation algorithm.

With the aforementioned operation, the generated pattern data is stored in the pattern database 500.

The operation staff of the plant 100 uses the data processing apparatus 610 to display these information on the display 620.

Thus, the operation staff can know what kind of state input can be currently used for patterning. Moreover, the operation staff can input threshold values J and K as the setting parameters via the display 620.

Figure 11:
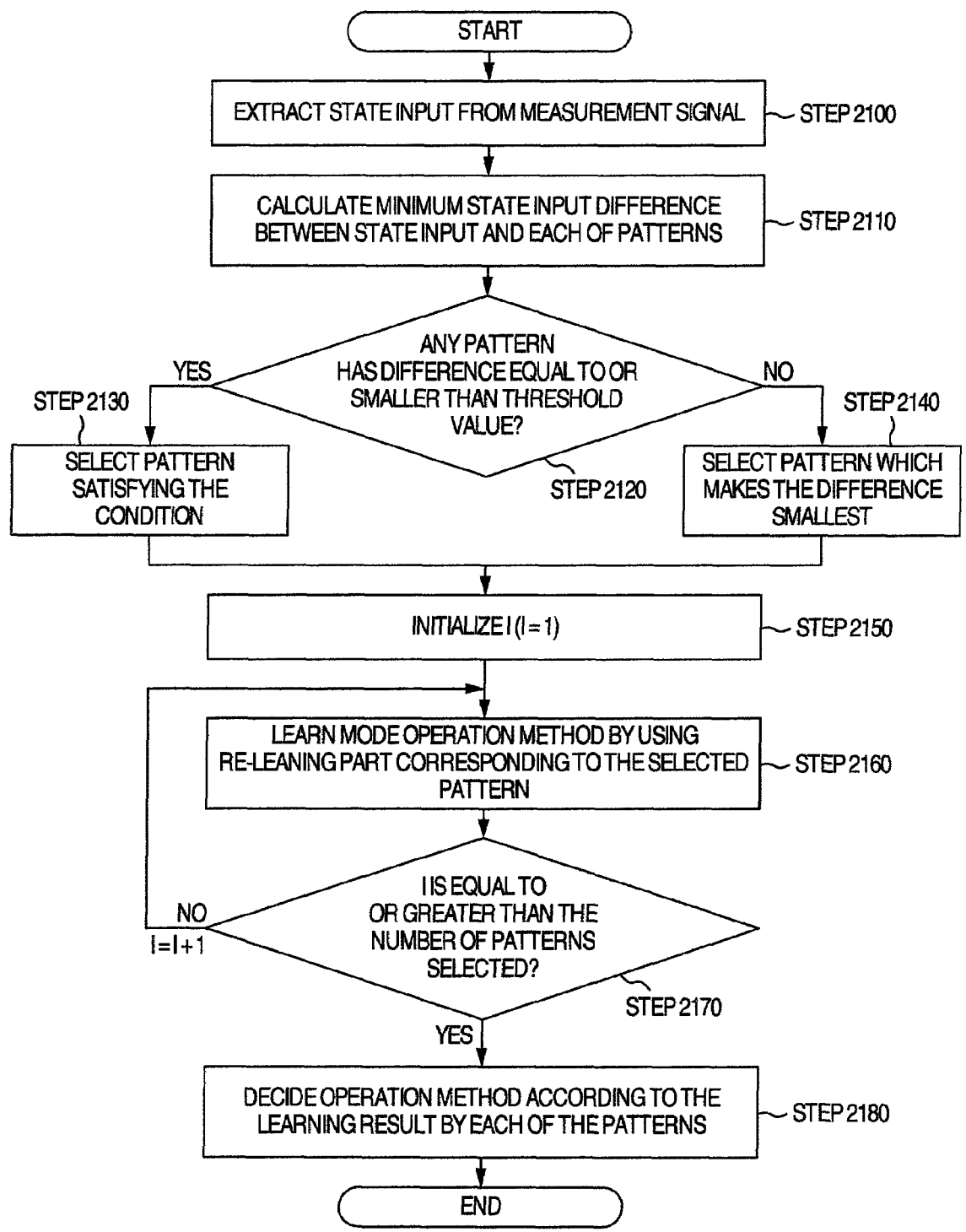
FIG. 11 is a flowchart showing the re-learning operation in the flowchart showing the operation of the plant control system according to the embodiment of the present invention shown in FIG. 4.

FIG. 11 is a flowchart showing the re-learning operation of step 1040.

As shown in FIG. 11, the flowchart of the re-learning operation is formed by a combination of steps 2100, 2110, 2120, 2130, 2140, 2150, 2160, 2170, and 2180.

Hereinafter, each of the steps will be detailed.

Step 2100 extracts the state input to be inputted to the re-learning part 265 from the measurement signal by using the model input generation part 261 of the learning part 260 constituting the control apparatus 260.

Next, step 2110 uses the pattern selection part 263 of the learning part 260 to calculate the minimum state input error between the extracted state input and the pattern data stored in the pattern database 500 of the control apparatus 200.

As shown in FIG. 8, the pattern database 500 contains a plurality of state input values for each of patterns and the minimum state input error is a minimum difference between these values and the current state input value.

The minimum state input error is the similarity between the current state input and the state input experienced in the pre-learning. Accordingly, it is possible to select a pattern corresponding to the state input having a high similarity with the current state input value according to the minimum state input error.

As a result, by using the selected pattern, it is possible to learn the operation amount which can obtain the control effect equivalent to the pre-learning result for the current state input.

Step 2120 is a branching section to decide whether any of the pattern minimum state input errors calculated in step 2110 is equal to or smaller than the predetermined threshold value. If yes, control is passed to step 2130. Otherwise, control is passed to step 2140.

Step 2130 selects all the patterns having the minimum state input error equal to or smaller than the threshold value and then control is passed to step 2150.

Step 2140 selects only the pattern having the smallest minimum state input error and control is passed to step 2150.

Next, step 2150 initializes (set I=1) the I as the value indicating the number of repetitions of the steps 2160.

Step 2160 learns the model operation method of the model 230 by using the re-learning part 265 of the learning part 260 corresponding to the selected pattern.

Step 2170 is a branching section. If I is equal to or smaller than the selected number of patterns, I is incremented by 1 and control is returned to step 2160 and learning is performed by using the re-learning part 265 corresponding to the another selected pattern.

Step 2180 decides the appropriate operation method among the re-learning results obtained by the selected pattern by using the learning result determination part 300 of the control apparatus 200 and outputs it to the operation signal generation part 280 of the control apparatus 200. Then, control is passed to the step to terminate the operation of re-learning.

With the aforementioned operation, re-learning can learn the operation method equivalent to the pre-learning result in a short time by using the pattern selected according to the pre-learning result for the current state input.

Moreover, it is possible to input the threshold value of the minimum state input error as the set parameter via the display 620.

Next, a detailed explanation will be given on the re-learning algorithm of step 2160 with reference to the flowchart of FIG. 12.

Figure 12:
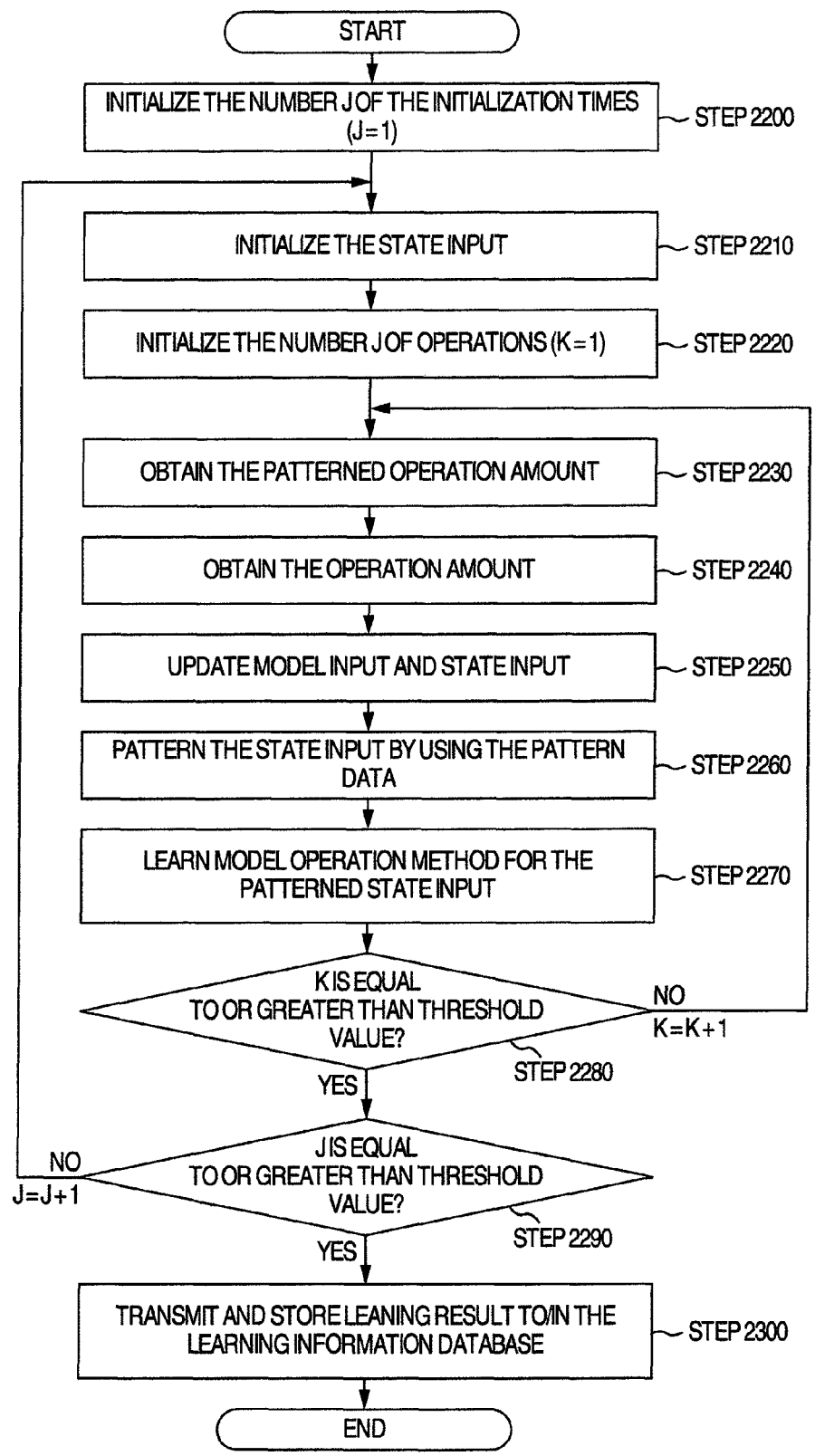
FIG. 12 is a flowchart showing a detailed explanation of a part of the re-learning operation in the flowchart showing the operation of the plant control system according to the embodiment of the present invention shown in FIG. 4.

As shown in FIG. 12, the flowchart of the operation of the re-learning algorithm is executed by a combination of steps 2200, 2210, 2220, 2230, 2240, 2250, 2260, 2270, 2280, 2290, and 2300.

Hereinafter, each of the steps will be detailed.

Step 2200 initializes (set J=1) the number of initializations J as a value indicating the number of repetitions of steps 2210 to 2280.

Next, step 2210 initializes the state input to an input value to be extracted from the measurement signal 3.

Step 2220 initializes (K=1) the number of repetitions K as a value indicating the number of repetitions of steps 2230 to 2270.

Next, step 2230 obtains the operation amount of the patterned model input by using re-learning part 265 of the learning part 260 corresponding to the pattern to be used.

Step 2240 linearly interpolates the operation amount of the patterned model input by using the pattern transforming part 264 of the learning part 260 so as to obtain the operation amount.

Step 2250 adds the operation amount to the state input by using the model input generation part 261 of the learning part 260 so as to operate the model and update the state input.

Step 2260 patterns the state input according to the pattern data to be used, by using the pattern transforming part 264 of the learning part 260.

Step 2270 learns the model operation method by using the neural network and various learning algorithms such as reinforced learning according to the model output obtained as a result of the model operation.

Step 2280 is a branching section where the number of operations K is compared to a predetermined threshold value. If K is smaller than the threshold value, K is incremented by 1 and control is returned to step 2230. Otherwise, control is passed to step 2290.

Step 2290 compares the number of initializations J to a predetermined threshold value. If J is smaller than the threshold value, J is incremented by 1 and control is returned to step 2210. Otherwise, control is passed to step 2300.

Step 2300 transmits the learned result to the learning information database 270 of the control apparatus 200 so as to be stored in it and control is passed to the step to terminate the operation of re-learning.

With the aforementioned operation, the re-learning uses the patterned state input to learn the operation method when the current state input is used as the initial value.

This completes the detailed explanation of the operations of the steps 1010, 1020, and 1040 shown in FIG. 4.

Next, explanation will be given on the screen displayed on the display 620 for displaying the data processing apparatus output signal 64 outputted from the data processing apparatus 610 constituting the plant control system 200 according to the embodiment of the present invention.

FIG. 13 to FIG. 20 show examples of the screen displayed on the display 620 attached to the plant control system 200 shown in FIG. 1.

Figure 13:
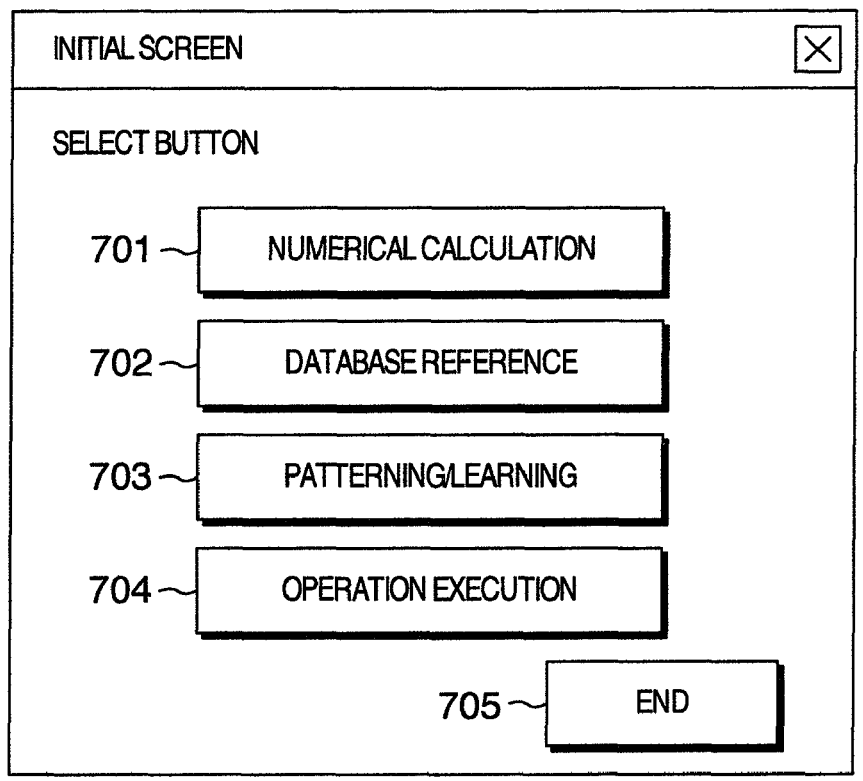
FIG. 13 shows an example of an initial screen displayed on a display mounted on the plant control system according to the embodiment of the present invention shown in FIG. 1.

FIG. 13 shows an example of an initial screen. By operating a mouse 602 to superimpose the cursor on a button and clicking the mouse 602 while the screen of FIG. 13 is displayed on the display 620, it is possible to select (press) the button.

When the button 701 of "numerical calculation", the button 702 of "database reference", the button 703 of "patterning/learning", and the button 704 of "operation execution" are selected, the screens of FIG. 14, FIG. 15, FIG. 16, and FIG. 17 are displayed on the display 620, respectively. Moreover, when the button 705 of "end" is selected, the initial screen is terminated.

Figure 14:
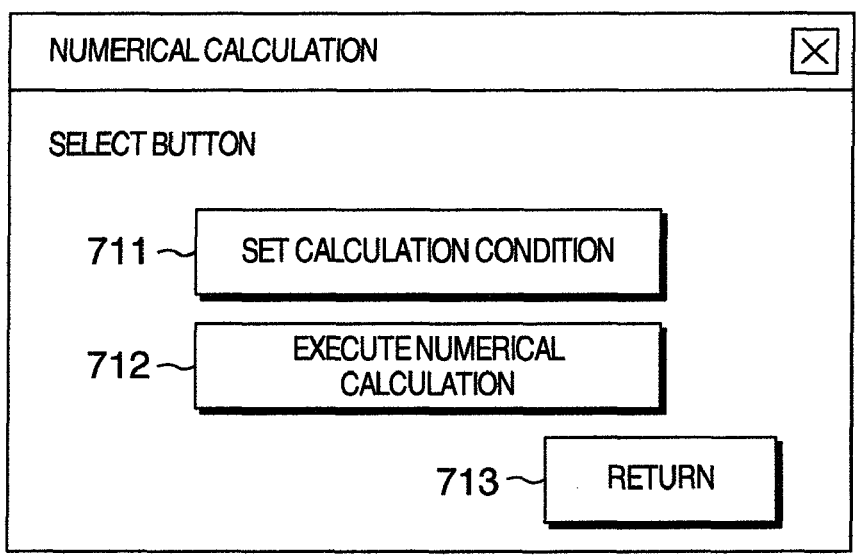
FIG. 14 shows an example of a screen displayed on the display when a numerical calculation is executed in the plant control system according to the embodiment of the present invention shown in FIG. 1.

FIG. 14 shows the case when the button 711 of "calculation condition setting" is selected so as to input/set various calculation conditions required for executing the calculation by the numerical calculation execution part 220 of the control apparatus 200.

Moreover, when the button 712 of "numerical calculation execution" is selected, it is possible to start calculation by the numerical calculation execution part 220. Moreover, when the button 713 "return" is selected, control is passed to FIG. 13.

Figure 15:
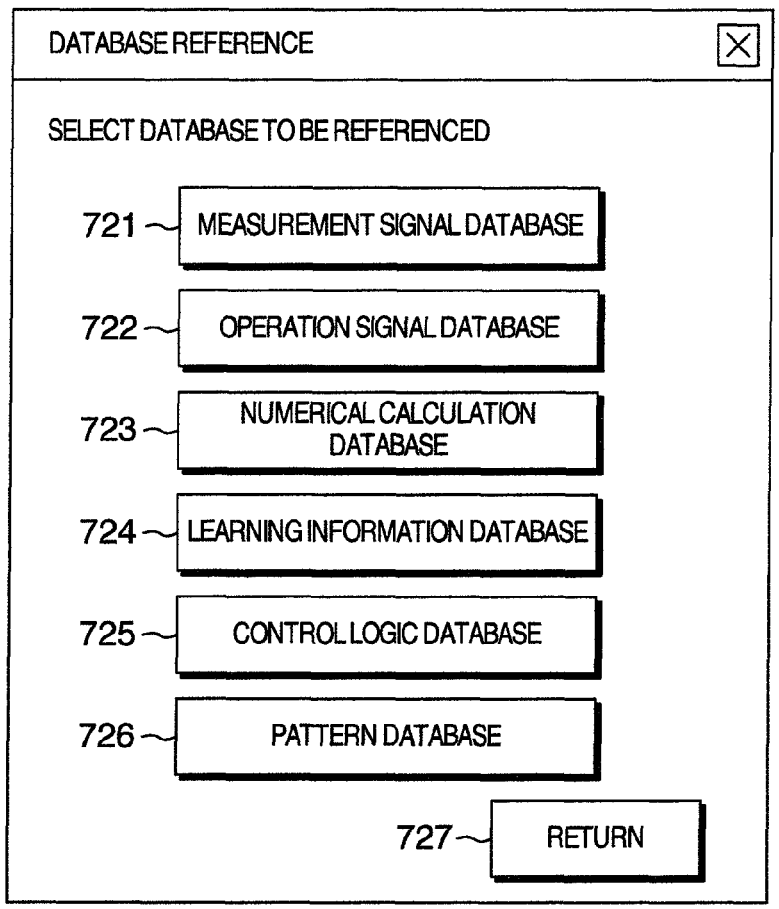
FIG. 15 shows an example of a screen displayed on the display when a database is referenced in the plant control system according to the embodiment of the present invention shown in FIG. 1.

On the screen of the display 620 shown in FIG. 15, it is possible to select a database containing information to be displayed.

By selecting the button 721 of "measurement signal database", the button 722 of "operation signal database", the button 723 of "numerical calculation database", the button 724 of "learning information database", the button 725 of "control logic database", and the button 726 of "pattern database", it is possible to access the measurement signal database 210, the operation signal database 250, the numerical calculation database 240, the learning database 270, the control logic database 290, and the pattern database 500, respectively.

It is possible to display the information in the respective databases on the display 620 and add new information to the information in the database and to modify or delete information in the database. Moreover, by selecting the button 727 of "return", the screen is returned to FIG. 13.

Figure 16:
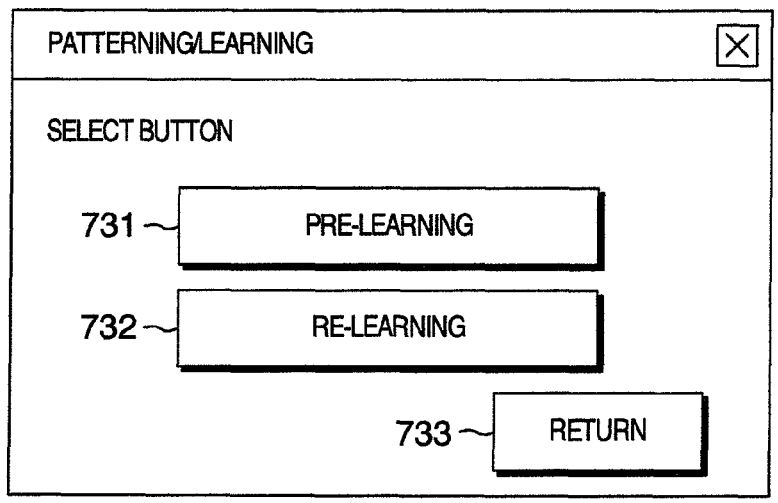
FIG. 16 shows an example of a screen displayed on the display when patterning and learning are executed in the plant control system according to the embodiment of the present invention shown in FIG. 1.
Figure 18:
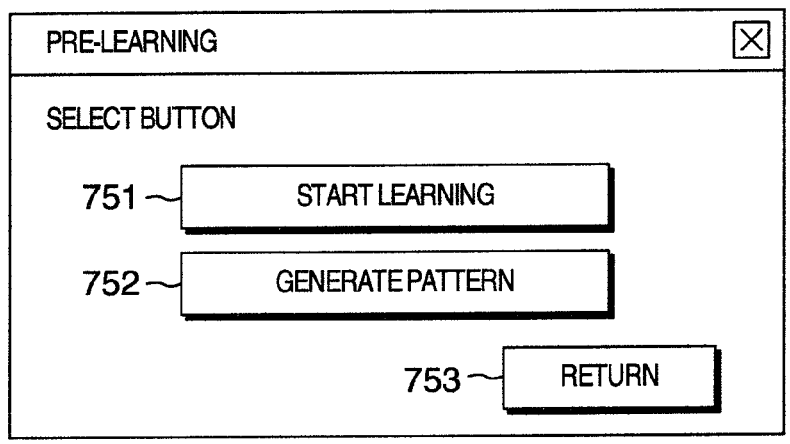
FIG. 18 shows an example of a screen displayed on the display when the pre-learning and the pattern generation are executed in the plant control system according to the embodiment of the present invention shown in FIG. 1.

On the screen of FIG. 16, when the button 731 of "pre-learning" is selected, the pre-learning screen shown in FIG. 18 appears.

Figure 19:
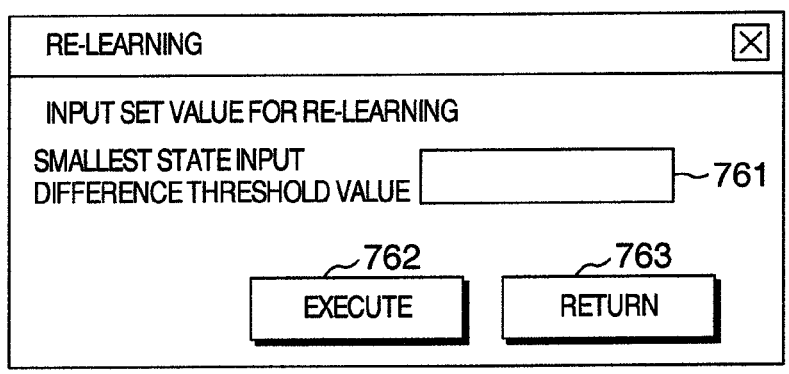
FIG. 19 shows an example of a screen displayed on the display when re-learning is executed in the plant control system according to the embodiment of the present invention shown in FIG. 1.

Moreover, when the button 732 of "re-learning" is selected on the screen of FIG. 16, the re-learning screen shown in FIG. 19 appears on the display 620. When the button 733 of "return" is selected, the screen of FIG. 13 appears.

Figure 17:
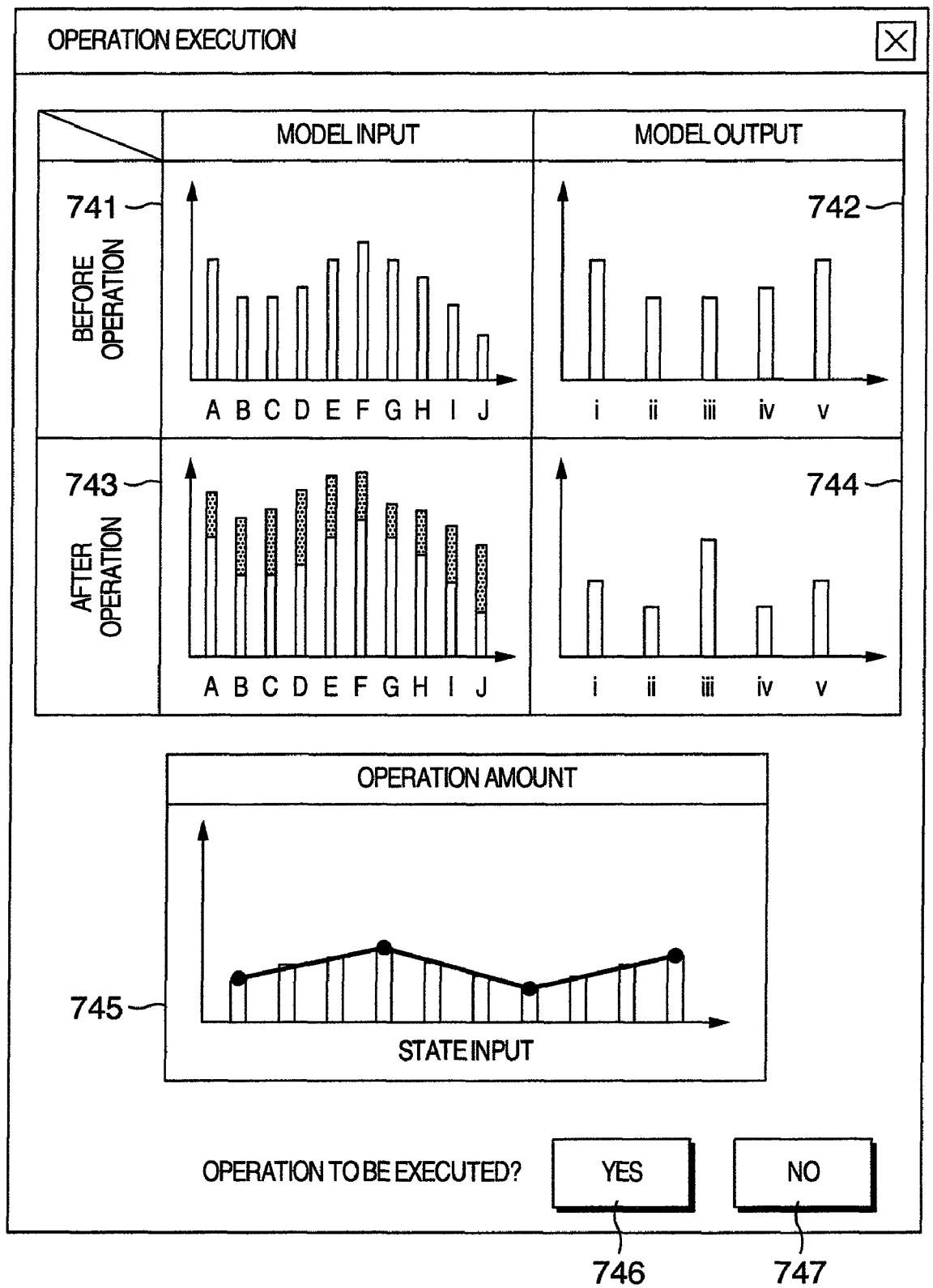
FIG. 17 shows an example of a screen displayed on the display when an operation is executed in the plant control system according to the embodiment of the present invention shown in FIG. 1.

The screen of FIG. 17 shows the model input 741 before operation, the model output 742, the model input 743 after the operation, model output 744, and the learned operation amount 745 as a guidance display, so that the plant operation staff can select whether to execute an operation on the guidance display.

When an operation is to be executed, the button 746 of "yes" is selected. Otherwise, the button 747 of "no" is selected.

On the display screen shown in FIG. 1, the operation staff can confirm the relationship between the pattern and the operation signal before operating the plant, which increases the reliability of the plant operation.

That is, the plant control method shown in FIG. 17 can be detailed as follows. In the plant control method of the control apparatus for controlling the plant by using a model simulating the plant, as shown in FIG. 8, the control apparatus has a pattern database containing the state input pattern which patterns a plurality of operation signals to be inputted to the model. Moreover, as shown in FIG. 7, the control apparatus includes a learning information database containing a plurality of operation signals to be inputted to the model and the output from the model. As shown as the model input 743 and the model output 744 after the operation, the plurality of operation signals stored in the learning information database and the output from the model are outputted to the display. As shown as the learned operation amount 745, the operation signal to the plant according to the plurality of operation signals inputted to the model and the state input pattern stored in the pattern database are superimposed and outputted to the display. As shown as the button 746 to be selected when an operation is to be executed, the plant is controlled by the operation signal to the plant according to permission of operation on the plant.

In FIG. 18, when the button 751 of "learning start" is selected, the pre-learning part 262 of the learning part 260 and the model 230 of the control apparatus 200 are operated according to the flowchart shown in FIG. 5 so as to execute the pre-learning of the operation method.

Figure 20:
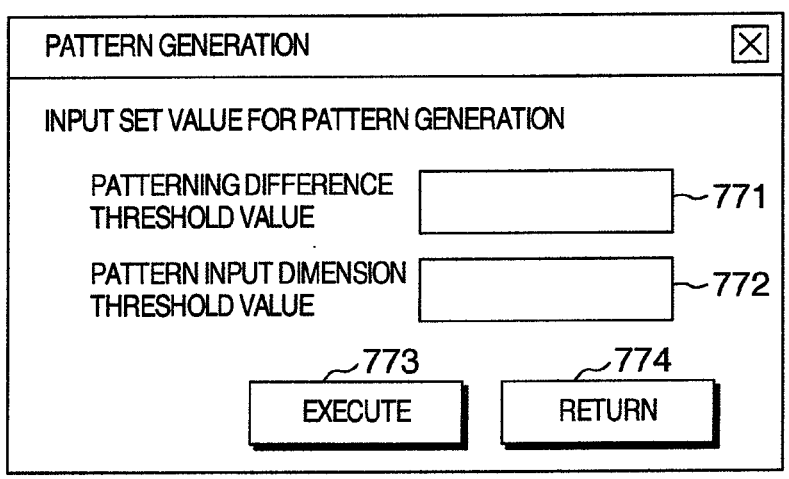
FIG. 20 shows an example of a screen displayed on the display when pattern generation is executed in the plant control system according to the embodiment of the present invention shown in FIG. 1.

Moreover, when the button 742 of "pattern generation" is selected the pattern generation screen shown in FIG. 20 appears on the display 620.

When the button 753 of "return" is selected, control is returned to FIG. 16.

In FIG. 19, it is possible to input the set value of the minimum state input error threshold value to be used in the flowchart of FIG. 11, into the data input column 761.

After the set value is inputted in the data input column 761, if the button 762 "execution" is selected, the learning part 260 of the control apparatus 200 and the model 230 are operated according to the flowchart shown in FIG. 11 so as to execute re-learning.

Moreover, if the button 763 of "return" is selected, control is returned to FIG. 16.

In FIG. 20, it is possible to input a set value of the patterning error threshold value used in the flowchart shown in FIG. 9 into the data input column 771, and the set value of the pattern input dimension threshold value into the data input column 772.

If the button 773 of "execution" is selected after the setting values are inputted into the data input columns 771 and 772, the pattern generation part 400 of the control apparatus 200 is operated according to the flowchart shown in FIG. 6 so as to execute pattern generation.

Moreover, if the button 774 of "return" is selected, control is returned to FIG. 18.

This completes the explanation on the screens displayed on the display 620.

As has been described above with reference to the flowcharts in FIG. 11 and FIG. 12, in the embodiment of the present invention, the state input inputted to the learning part of the plant control system is patterned with a smaller number of inputs than the model input dimension so as to reduce the model search space, thereby enabling a high-speed learning.

Moreover, a desired learning result can always be obtained by generating a pattern by using a pre-learning result without reducing the input dimension in advance before start of the plant operation as has been detailed with reference to the flowchart in FIG. 5, and comparing the similarity of the current state input to the state input contained in the pre-learning result after start of the plant operation so that a pattern generated from the state input having a higher similarity is selected for learning the operation method as has been detailed with reference to the flowchart of FIG. 11.

Moreover, as has been detailed with reference to the flowchart of FIG. 9, it is possible to automatically generate a pattern input dimension and pattern information by an evolutionary search algorithm, which enables pattern generation not requiring any manual operation while preventing an erroneous patterning.

Furthermore, the plant operation staff can visually check the state of the patterning and the effect of the patterned learning because the apparatus has the function to reference the information stored in the respective databases on the display and the function to input setting parameters to be used in the learning part and the pattern generation part via the display as has been detailed with reference to FIG. 13 to FIG. 20.

Next, explanation will be given on a case that the plant control system 200 as the embodiment of the present invention shown in FIG. 1 to FIG. 20 is applied to a thermal power plant 100 having a boiler. It should be noted that the plant control system 200 may be used for control of other plants than the thermal power plant.

Figure 21:
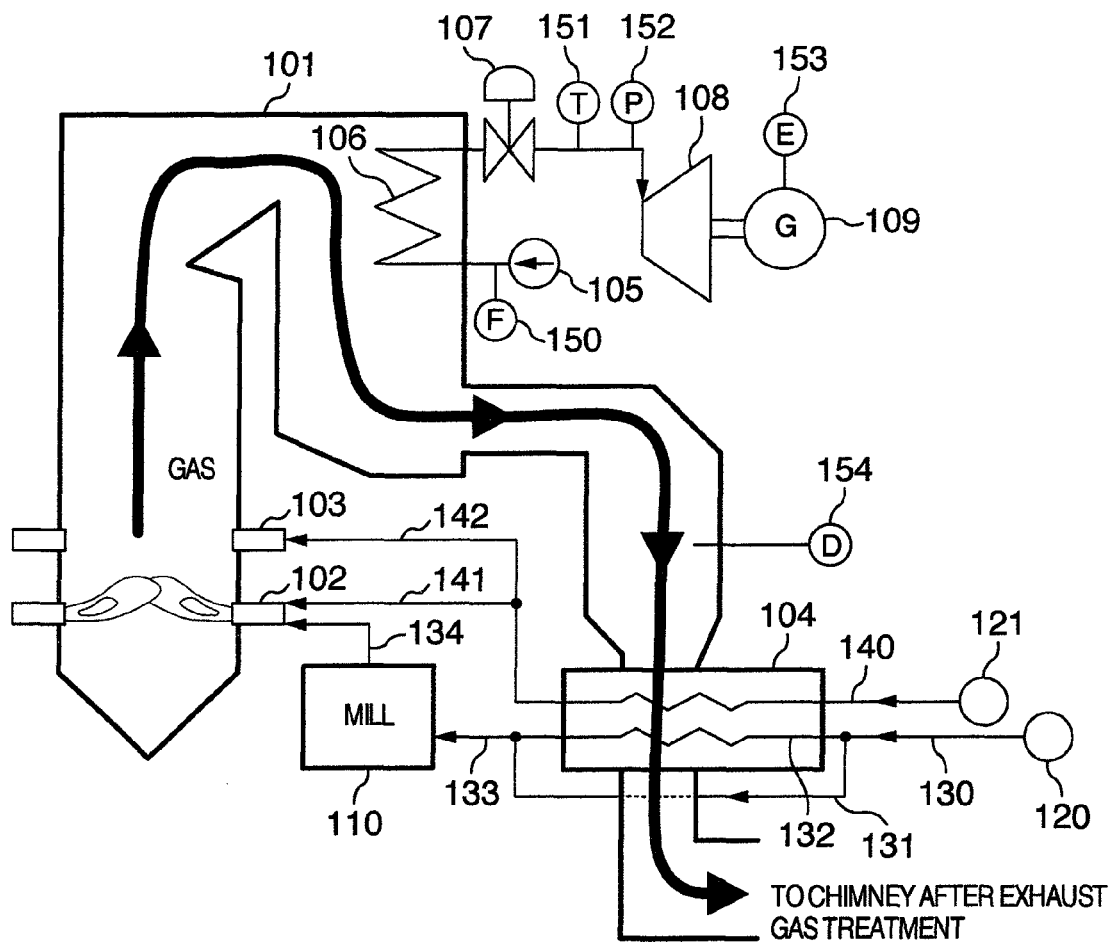
FIG. 21 shows a configuration outline of a thermal power plant including boiler to be controlled by employing the plant control system according to the embodiment of the present invention shown in FIG. 1.

FIG. 21 shows an outline of the thermal power plant having a boiler. Firstly, explanation will be given on the mechanism of the thermal power plant having the boiler.

In the thermal power plant shown in FIG. 21, coal as fuel is crushed into fine coal powder by a mill 110 and introduced via a burner 102 into a boiler 101 together with a primary air for feed of the coal powder and a secondary air for combustion adjustment. The coal as the fuel burns in a furnace of the boiler 101.

The coal as the fuel and the primary air are introduced via a pipe 134 while the secondary air is introduced via a pipe 141 into the burner 102.

Moreover, the after-air for two-stage combustion is introduced into the boiler 101 via an after-air port 103 installed in the boiler 101. The after-air is introduced into the after-air port 103 from a pipe 142.

The high-temperature combustion gas generated by combustion of the fuel coal inside the furnace of the boiler flows downward along a route shown by arrows in the furnace of the boiler 101 and passes through a heat exchanger 106. After the heat exchange, the combustion exhaust gas is discharged from the boiler 101 and flows downward toward an air heater 104 installed outside the boiler 101.

The combustion exhaust gas which has passed through the air heater 104 comes into an exhaust gas treating device (not depicted). After harmful substances are removed from the combustion exhaust gas, the exhaust gas is discharged into the atmosphere through a chimney.

Water circulating in the boiler 101 is introduced from a condenser (not depicted) installed in a turbine 108 into the boiler 101 via a water feed pump 105. The water is heated in the heat exchanger 106 by the combustion gas flowing downward in the furnace of the boiler 101 and becomes vapor of a high temperature.

It should be noted that in this embodiment, only one heat exchanger is depicted. However, it is also possible to arrange a plurality of heat exchangers.

The vapor of a high temperature and a high pressure generated in the heat exchanger 106 is introduced via a turbine governor valve 107 to the vapor turbine 108 so that energy of the vapor drives the vapor turbine 108 to rotate a generator 109 coupled to the vapor turbine 108 and generate electricity.

Next, explanation will be given on routes of the primary air and the secondary air introduced into the furnace of the boiler 101 from the burner 102 installed in the furnace of the boiler 101 and the route of the after-air introduced into the furnace of the boiler 101 from the after-air port 103 installed in the furnace of the boiler 101.

The primary air is introduced from a fan 120 into a pipe 130 which is branched to a pipe 132 which passes through the air heater 104 and a pipe 131 which bypasses the pipe 132 and the air heater 104. The primary air which has flown downward through the pipes 132 and 131 is again mixed in a pipe 133 and introduced into the mill 110.

The air which passes through the air heater 104 is heated by the combustion exhaust gas discharged from the furnace of the boiler 101.

The coal (fine coal powder) generated in the mill 110 by using the primary air is fed through the pipe 133 to the burner 102.

The secondary air and the after-air are introduced from a fan 121 into a pipe 140 and flows downward in the pipe 140 which passes through the air heater 104, so as to be heated. After the heating, the pipe 140 is branched into a pipe 141 for the secondary air and a pipe 142 for the after-air, which are respectively introduced to the burner 102 and the after-air port 103 installed in the furnace of the boiler 101.

The control apparatus 200 for the thermal power plant 100 having the boiler according to the present embodiment has the function to adjust the air amount to be introduced from the burner 102 into the boiler 101 and the air amount to be introduced from the after-air port 103 into the boiler 101 so as to reduce the NOx and CO concentrations in the exhaust gas from the boiler.

The thermal power plant 100 includes various measurement devices for detecting the operation state of the thermal power plant. A measurement signal obtained from the measurement devices is sent as a measurement signal 1 to the control apparatus 200.

The measurement devices for detecting the operation state of the thermal power plant 100 may be, for example, a flowmeter 150, a thermometer 151, a pressure indicator 152, a generated electricity measuring device 153, and a concentration measuring device 154 for measuring $O_2$ concentration and/or CO concentration as shown in FIG. 2.

The flowmeter 150 measures the flow rate of water supplied from a water feed pump 105 to the boiler 101. Moreover, the thermometer 151 and the pressure indicator 152 respectively measure the temperature and the pressure of the vapor generated by the heat exchange with the combustion gas flowing downward in the boiler 101 in the heat exchanger 106 in the boiler 101 and supplied to the vapor turbine 108.

The generated electricity measuring device 153 measures the electricity generated by a generator 109 rotated by the vapor turbine 108 which is driven by the vapor generated by the heat exchanger 106.

Moreover, information on the concentrations of the components (such as CO and NOx) contained in the combustion gas flowing downward in the boiler 101 is measured by the concentration measuring device 154 arranged at the exit of the boiler at the downstream side of the boiler 101 so as to measure the $O_2$ concentration and/or the CO concentration.

It should be noted that a plenty of other measuring devices than those shown in FIG. 2 are arranged on the thermal power plant 100 but they are not depicted.

Figure 22:
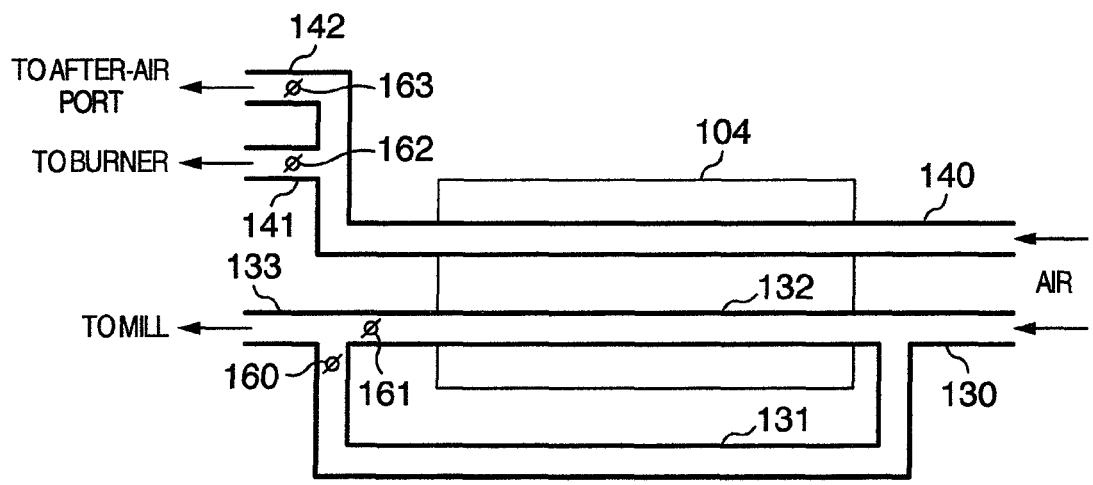
FIG. 22 is an enlarged view of an air heater portion in the boiler of the thermal power plant to be controlled shown in FIG. 21.

FIG. 22 is a partial enlarged diagram showing the air heater 104 arranged at the downstream side of the boiler 101 constituting the thermal power plant 100 and the pipes arranged in the air heater 104.

As shown in FIG. 22, air dampers 162, 163, 161, 160 are respectively arranged in a pipe 131 which bypasses the secondary air pipe 132, the after-air pipe 142, the pipe 132 arranged inside the air heater 104, and the air heater 104 which are branched at the downstream side of the pipe 140 arranged inside the air heater 104.

By operating the air dampers 160 to 163, it is possible to change the area where the air passes inside the pipes 131, 132, 141, 142 so as to separately adjust the air flow rate in the pipes 132, 132, 141, and 142.

By using the operation signal 15 outputted to the thermal power plant 100 by the control apparatus 200 which controls the thermal power plant 100, it is possible to operate the water feed pump 105, the mill 110, the air dampers 160, 161, 162, 163, and other devices.

It should be noted that in the control apparatus 200 for the thermal power plant 100 according to the embodiment, devices for adjusting the state amount of the thermal power plant such as the water feed pump 105, the mill 110, the air dampers 160, 161, 162, 163 are called operation ends and instruction signals required for operating them are called operation signals.

Figure 23:
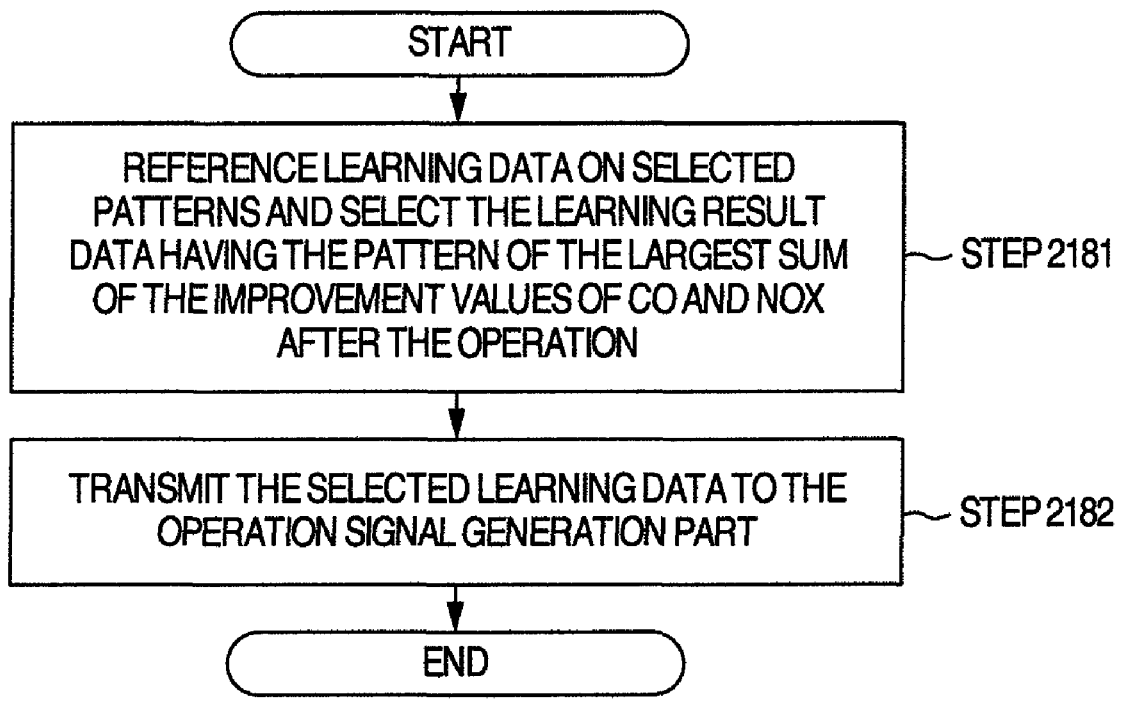
FIG. 23 is a flowchart showing a part of the re-learning process in the control apparatus of the thermal power plant having the boiler according to the embodiment of the present invention shown in FIG. 21.

FIG. 23 is a flowchart showing the process of the thermal power plant control method in the control apparatus 200 of the thermal power plant 100 having the boiler in the embodiment of the present invention shown in FIG. 21.

In FIG. 23, the control apparatus 200 for the thermal plant 100 having the boiler in the embodiment executes control of the thermal power plant 100 by combining the steps 2181 and 2182.

Step 2181 references the learning data obtained by each of the patterns selected by the pattern selection part 263 constituting the learning part 260 of the control apparatus 200 which controls the thermal power plant 100, compares the total of improvement values of the CO and NOx as the model output amount after the operation for current state input, and selects the maximum total of the improvement values.

Moreover, when the number of patterns selected by the pattern selection part 263 is 1, control is passed to step 2182 without performing the aforementioned process.

Step 2182 transmits the learning data 12 of the pattern selected by the pattern selection part 263 to the operation signal generation part 280 and passes control to step to terminate the operation of the learning result determination part 300 constituting the control apparatus 200.

With the aforementioned operation, the control apparatus 200 uses the learning data to obtain the best improvement values of CO and COx as the result of re-learning so as to generate an operation signal.

Figure 24:
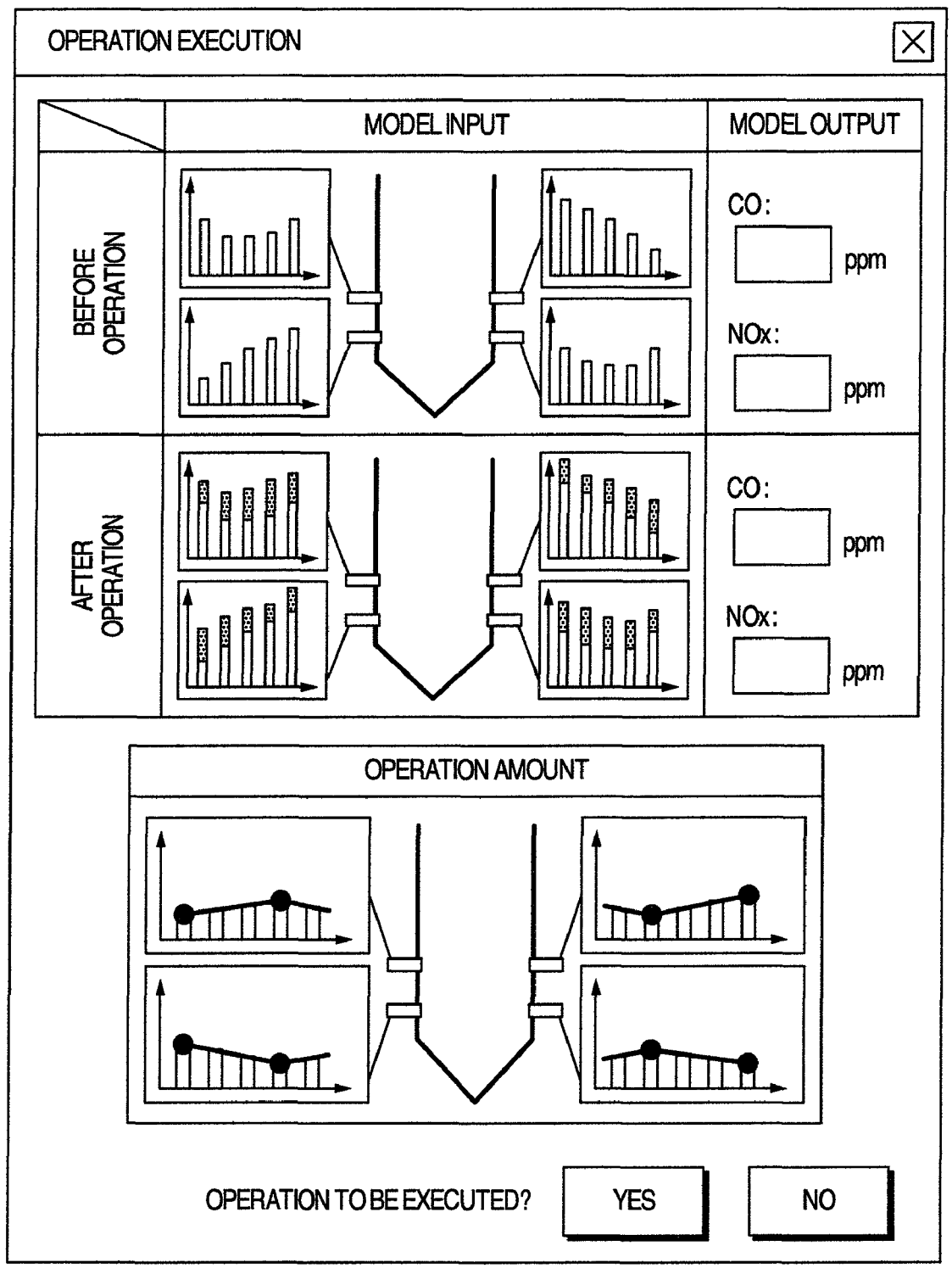
FIG. 24 is an example of a screen shown on the display when an operation is performed for the control apparatus of the thermal power plant having the boiler according to the embodiment of the present invention shown in FIG. 1.

FIG. 24 shows an example of the screen displayed on the display 620 in the control apparatus 200 of the thermal power plant 100 having the boiler according to the embodiment of the present invention.

FIG. 24 shows an example of screen which shows the air amount of the burner 102 of the boiler 101 used as the model input 7 inputted to the model 230 constituting the control apparatus 200, the air amount of the air port 103, guidance display of the concentrations of CO, NOx used in the model output 8 by simulation-calculating the thermal power plant to be controlled by the model 230 before and after the operation, and the operation amounts of the burner 102, and the air port 103 learned by the learning part 265 by the patterning of the pattern transforming part 264. The model input 7 displays distribution of the air amount of the burner 102/air port 103 arranged before and after a tank of the boiler 101 while correlating them with the boiler structure diagram.

It should be noted that in FIG. 25, the burner 102 and the air port 103 are arranged before and after the tank of the boiler 101 respectively as one stage each having five air entrances. However, the numbers can be modified to an arbitrary value.

The operation staff of the plant can check the control effect obtained by the patterned operation amount and the learned operation method to decide presence/absence of the operation while watching the screen shown in FIG. 24.

Figure 25A:
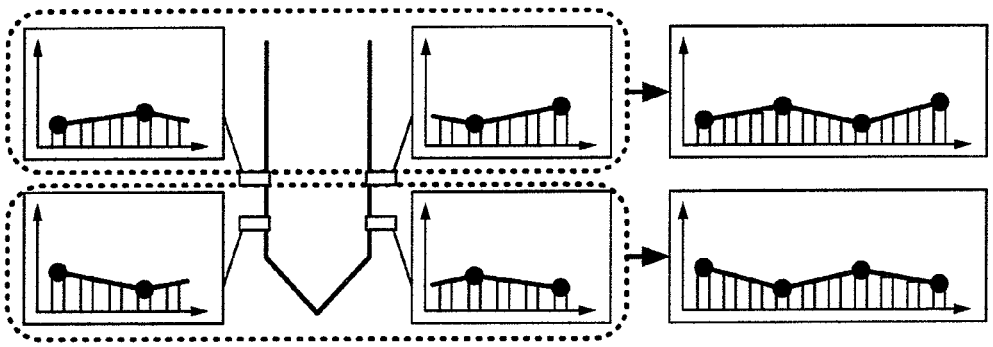
FIGS. 25A-25C explain examples of patterned grouping in the control apparatus of the thermal power plant having the boiler according to the embodiment of the present invention shown in FIG. 1.
Figure 25B:
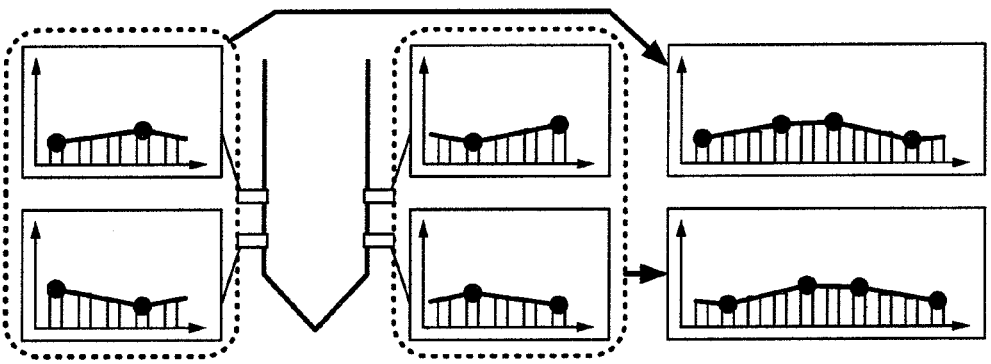
Figure 25C:
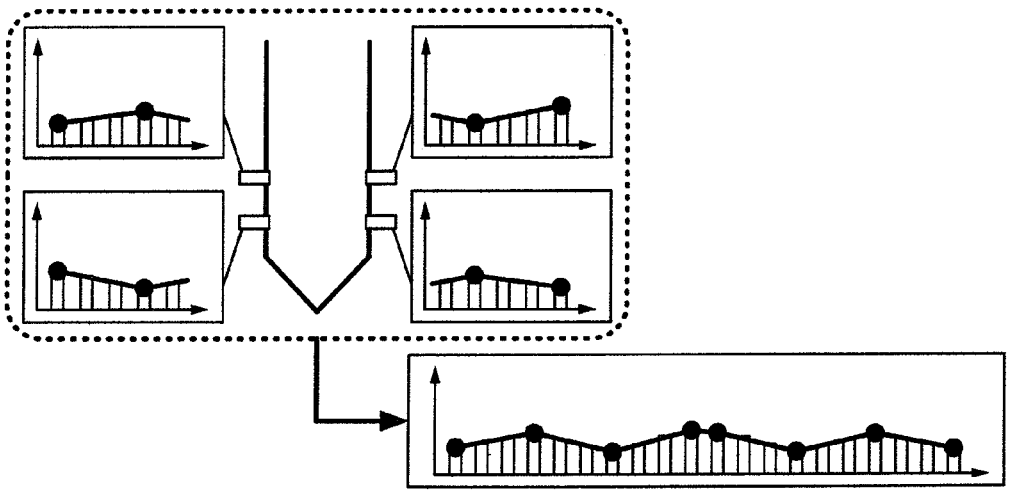

Moreover, as shown in FIGS. 25A to 25C, patterning in the control apparatus 200 for the thermal power plant 100 having the boiler according to the embodiment of the present invention may be realized, for example, as (1) grouping of the operation ends for each of the burner 102 and the air port 103 of the boiler 101 (FIG. 25A), (2) grouping of the operation ends before/after the tank of the boiler 101 (FIG. 25B), and (3) grouping of all the operation ends of the boiler 101 (FIG. 25C).

As is clear from the aforementioned, the operation staff of the thermal power plant 100 having the boiler can control the thermal power plant by selecting the appropriate patterning method by considering the type of the operation end, the number of operation ends, and the combustion characteristic of the boiler of the thermal power plant to be controlled.

According to the embodiment of the present invention, it is possible to provide a plant control system which corrects the model according to the measurement signal which has measured the operation state of the plant, executes the high-speed learning so as to perform re-learning by using the corrected model and correct the plant control algorithm, thereby accurately control the plant.

The present invention can be applied to a plant control system and in particular, to a control apparatus for a thermal power plant.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A plant control system for controlling a plant, comprising:
    an operation signal generation part which calculates a control operational signal for the plant to be controlled, by using a measurement signal which has measured an operation state of the plant;
    a measurement signal database which stores measurement signals of the plant;
    an operation signal database which stores control operational signals generated by the operation signal generation part, for the plant;
    a numerical calculation execution part which analyzes an operation characteristic of the plant, to calculate a numerical calculation result for use in simulation modeling of the plant;
    a numerical calculation database which stores numerical calculation results from the numerical calculation execution part;
    a simulation model part preparing a simulation model which simulates a control characteristic of a plant when a subject control operational signal is supplied to the plant, according to information on the numerical calculation result from the numerical calculation database;
    a learning part which learns a plant operation method by using the simulation model, to generate learning information data;
    a learning information database which stores learning information data from the learning part;
    a control logic database which contains control logic data used by the operation signal generation part, in the calculating of the control operational signal;
    a pattern generation part which generates pattern data expressing a state input, based on subject learning information data;
    a pattern database which stores the pattern data generated in the pattern generation part; and
    a learning result determination part which selects a learning result having a preferable control effect from plural learning results obtained by using a plurality of patterns;
    wherein the control operational signal is calculated by the operation signal generation part according to the learning result selected by the learning result determination part.

2. The plant control system as claimed in claim 1, wherein the learning part includes:
    a model input generation part which generates an input to be applied to the model and extracts a model input from a plant measurement signal;
    a pre-learning part which uses the learning information data stored in the learning information database before start of the plant operation so as to learn the model input generation part so that the model output simulated/calculated by the model achieves its target value;
    a pattern database which contains a pattern generated by using the pattern generation part for the learning information data obtained by the pre-learning by the pre-learning part;
    a pattern selection part which selects a pattern similar to the measurement signal from the pattern data stored in the pattern database after start of the plant operation;
    a pattern transforming part which patterns the state input to be inputted to the learning part by using the selected pattern, linearly interpolates the inter-inputs for the learned and patterned operation amount; and
    a re-learning part which performs learning with a reduced input dimension of the model input by using the selected pattern so that the model output simulated/calculated in the model by using the learning information data stored in the learning information database after start of the plant operation achieves its target value.

3. The plant control system as claimed in claim 1, the pattern generation part constituting the control apparatus has:
    a function of performing repeated search while successively incrementing the input dimension by 1 starting from the input dimension 1 until the end condition is satisfied in order to generate pattern data for a model operation amount contained in the learning information data learned by using the pre-learning part before start of the plant operation; and
    a function of generating a plurality of pattern data candidates as the pattern data search part, performing a genetic operation such as mixing and mutation on them, and repeating the search so as to search for the pattern data.

4. The plant control system as claimed in claim 2, wherein the learning part constituting the control apparatus compares the current state input to the state input contained in the pre-learning result in the pattern selection part after the plant operation start and selects the pattern generated from the state input having the higher similarity so as to learn the operation method.

5. The plant control system as claimed in claim 1, wherein the control apparatus includes a data processing device and a display which displays information stored in a measurement signal database, an operation signal database, a control logic database, a learning information database, a numerical calculation database, and a pattern database.

6. The plant control system as claimed in claim 5, wherein setting parameters used in the learning part and the pattern generation part constituting the control apparatus are inputted via an input part connected to the data processing apparatus.

7. The plant control system as claimed in claim 1, wherein the plant to be controlled is a thermal power plant including a boiler configured as follows: operation ends to which the plant operation signal is outputted are a burner which generates a high-temperature gas by a combustion reaction using fossil fuel and air and an air port which supplies air to the combustion gas from the rear side of the flow of the combustion gas generated by mixing the fossil fuel and the air supplied from the burner; the measurement signal of the measured plant is a measurement signal of the concentration of carbon monoxide and the concentration of nitrogen oxide obtained by measuring the carbon monoxide concentration and nitrogen oxide concentration of the fuel gas burned in the boiler by using a measurement device; the learning result determination part constituting the control apparatus selects such learning information data by a selected pattern that the total of the improvement values indicating the differences between the concentrations of the carbon monoxide and the concentrations of the nitrogen oxide in the combustion gas before and after the operation is maximum so as to generate the operation signal.

8. The plant control system as claimed in claim 7, wherein the state input parameter to be patterned in the learning result judging part constituting the control apparatus is the air flow rate introduced into the boiler separately from the burner and the air port arranged in the boiler.

9. The plant control system as claimed in claim 7, wherein the learning result judging part constituting the control apparatus uses one of the following methods: grouping of state inputs to be patterned; grouping for the burner and the air port, respectively; grouping of the entire boiler.

10. A plant control method for a control apparatus which controls a plant by using a model simulating the plant, the method comprising steps of:
    providing a pattern base containing a state input pattern in which a plurality of operations signals to be inputted to the model by the control apparatus are patterned;
    providing a learning information database containing a plurality of operation signals to be inputted to the model and an output from the model;
    outputting the plurality of operation signals stored in the learning information database and the output from the model to a display;
    outputting to the display, an operation signal to the plant based on the plurality of operation signals inputted to the model and the state input pattern stored in the pattern data base while superimposing them on each other; and
    controlling the plant by the operation signal to the plant according to permission of the operation execution on the plant.

* * * * *